US010514518B1

(12) United States Patent
Livingston et al.

(10) Patent No.: US 10,514,518 B1
(45) Date of Patent: Dec. 24, 2019

(54) DENSE OPTICAL TERMINATION AND PATCHING PLATFORMS, SYSTEMS, AND METHODS

(71) Applicant: Connectivity Solutions Direct LLC, Mentor, OH (US)

(72) Inventors: Joseph C. Livingston, McKinney, TX (US); Wade J. Womack, Allen, TX (US)

(73) Assignee: Connectivity Solutions Direct LLC, Mentor, OH (US)

( * ) Notice: Subject to any disclaimer, the term of this patent is extended or adjusted under 35 U.S.C. 154(b) by 0 days.

(21) Appl. No.: 16/455,695

(22) Filed: Jun. 27, 2019

Related U.S. Application Data

(60) Provisional application No. 62/823,088, filed on Mar. 25, 2019.

(51) Int. Cl.
*G02B 6/44* (2006.01)

(52) U.S. Cl.
CPC ......... *G02B 6/4452* (2013.01); *G02B 6/4454* (2013.01)

(58) Field of Classification Search
CPC ............................ G02B 6/4452; G02B 6/4454
See application file for complete search history.

(56) References Cited

U.S. PATENT DOCUMENTS

| 9,223,094 B2 * | 12/2015 | Schneider | G02B 6/3885 |
| 2019/0187394 A1 * | 6/2019 | Fontaine | G02B 6/4455 |

OTHER PUBLICATIONS

International Search Report and Written Opinion received in Patent Cooperation Treaty Application No. PCT/US2019/040911, dated Aug. 30, 2019, 6 pages.

* cited by examiner

*Primary Examiner* — Ryan A Lepisto
(74) *Attorney, Agent, or Firm* — Hubbard Johnston, PLLC

(57) ABSTRACT

With respect to fiber optic structured cabling, dense optical termination and patching platforms, systems, and methods herein involve using an optical-connector adapter cassette that has double rows of adapters on a front portion and at least one goose-neck portion that transitions to a single row of adapters on a rear portion. The double rows of adapters may have virtually no geometry between them. Two cassettes may be cantilevered at the front of a fiber-optic enclosure. The systems includes other aspects.

27 Claims, 21 Drawing Sheets

DENSE OPTICAL TERMINATION AND PATCHING PLATFORMS, SYSTEMS, AND METHODS

CROSS-REFERENCE TO RELATED APPLICATION

This application claims the benefit of U.S. Provisional Application Ser. No. 62/823,088, filed by Joseph C. Livingston, et al., on Mar. 25, 2019, entitled "Dense Optical Termination and Patching Platforms, Systems, and Methods," which is incorporated herein by reference in its entirety for all purposes.

TECHNICAL FIELD

This application is directed, in general, to structured optical cable systems, and more specifically, to dense optical termination and patching platforms, systems, and methods.

BACKGROUND

Fiber optic structured cabling is a convenient way to facilitate cable connectivity at a data center or building or other location. Structured cabling stands in contrast to direct connections in which lines run from one object to another without structured patch panels. One of the challenges in the structured cabling area is to provide greater and greater density of connections while maintaining the desired usability.

SUMMARY

According to one illustrative embodiment an optical-connector shelf assembly includes a fiber-optic enclosure having an interior portion and a plurality of trays at least partially within the interior portion and a first optical-connector adapter cassette and a second optical-connector adapter cassette supported by the plurality of trays. Each optical-connector adapter cassette includes a housing having a front wall, a back wall that is opposite the front wall, a first side wall, a second side wall that is opposite the first side wall, a floor wall, and a cover that together form a cassette interior space. The cover is substantially rectangular in a top view. The first side wall and second side wall each have a front end and a back end. The front end and the back end are separated by a longitudinal distance D.

The front end of the first side wall and the front end of the second side wall each have a height H1. The back end of the first side wall and the back end of the second side wall each have a height H2, and wherein H1>H2. A goose-neck section is formed on the first side wall and the second side wall closer to the front portion than the back portion. Each optical-connector adapter cassette further includes at least one multi-fiber cable adapter mounted with one or more openings on the back wall of the housing; a plurality of fiber-optic adapters mounted within openings on the front wall of the housing; and optical connections positioned within the interior of the housing connected to the at least one multi-fiber cable adapter and the plurality of fiber-optic adapters.

The first optical-connector adapter cassette and the second optical-connector adapter cassette are supported by the plurality of trays with the floor wall of the first optical-connector adapter cassette proximate to the cover of the second optical-connector adapter cassette at a front section proximate the goose-neck section of each and wherein the plurality of trays does not extend between a front section of the first optical-connector adapter cassette and a front section of the second optical-connector adapter cassette.

According to still another illustrative example, an optical-connector adapter cassette includes a housing having a front wall, a back wall that is opposite the front wall, a first side wall, a second side wall that is opposite the first side wall, a floor wall, and a cover that together form a cassette interior space. The cover is rectangular in a top view. The first side wall and second side wall each have a front end and a back end separated by a longitudinal distance D. The front end of the first side wall and the front end of the second side wall both have a height H1. The back end of the first side wall and the back end of the second side wall each have a height H2, and the relationship is H1>H2. The optical-connector adapter cassette also includes a first goose-neck section that is formed on the first side wall and the second side wall closer to the front wall than the back wall; at least one opening sized and configured to receive at least one multi-fiber cable adapter on the back wall of the housing; and a plurality of openings formed on the front wall that are sized and configured to receive a plurality of fiber-optic adapters at the front wall of the housing. Other embodiments are disclosed herein.

DESCRIPTION OF THE DRAWINGS

Illustrative embodiments of the present invention are described in detail below with reference to the attached drawing figures, which are incorporated by reference herein and wherein.

DETAILED DESCRIPTION

Figure 1:
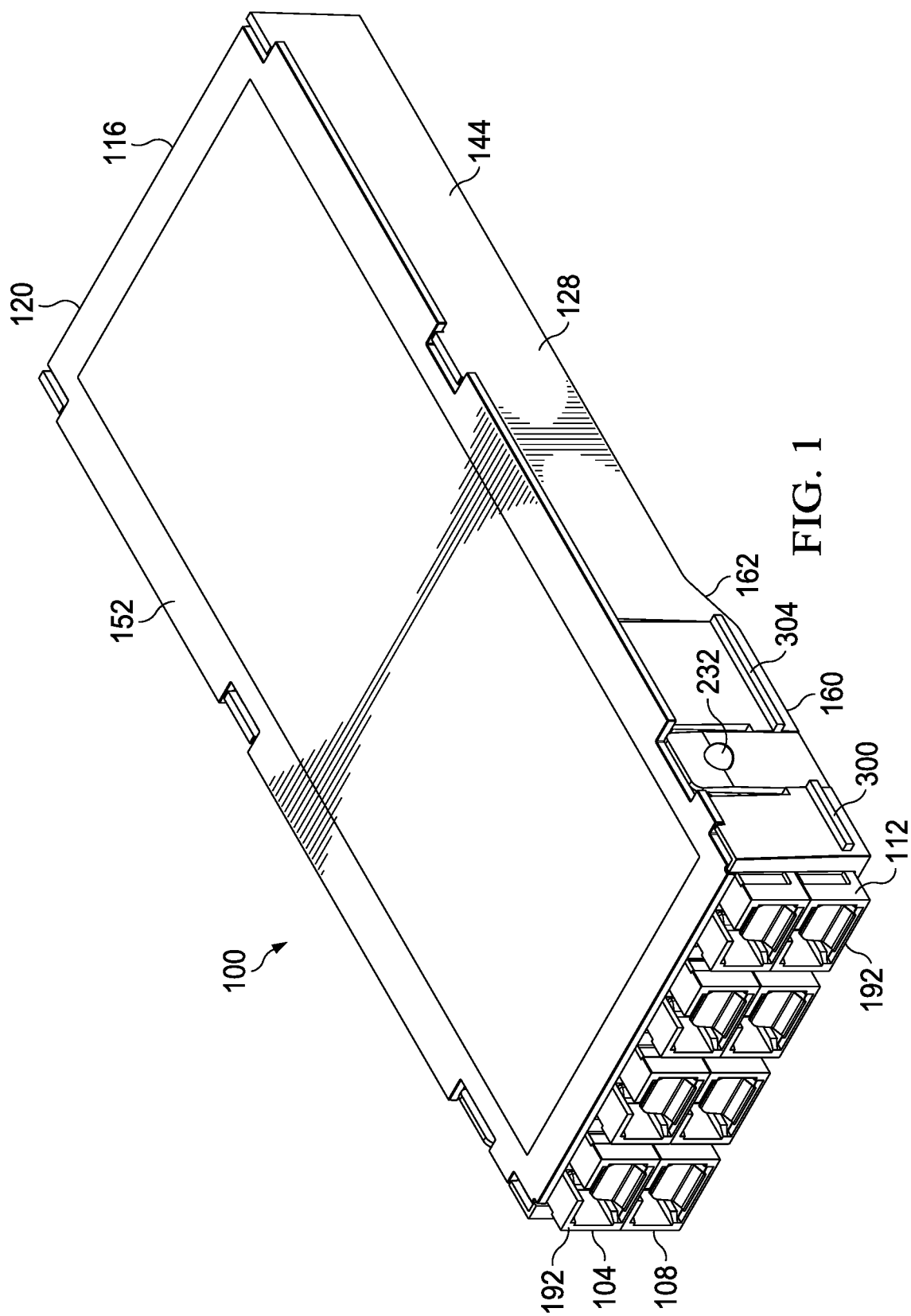
FIG. 1 is a schematic perspective view of an optical-connector adapter cassette according to an illustrative embodiment.

In the following detailed description of the preferred embodiments, reference is made to the accompanying drawings that form a part hereof, and in which is shown, by way of illustration, specific embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the claims.

Unless otherwise indicated, as used throughout this document, "or" does not require mutual exclusivity.

The embodiments herein relate to fiber optic structured cabling. Structured cabling is in contrast to direct connections where lines run from one object to another without structured patch panels. The context is structured cabling where the connections go into a central patch panel and then patches from the active devices to the patch panel. Then the routing trunk cabling goes to different areas of the data center or building. There is a patch panel on that side for connecting to equipment. This approach gives one flexibility in addressing the environment and to change things; one is not plugging into a server but into a patch field. This approach also isolates resources as to who is doing what.

Data center space and space in the switching rooms in buildings are space constrained. The more connectivity and devices, the more needs to be consolidated there. Patch field density is important. The embodiments herein efficiently address the density while complying with applicable standards. It is desirable to get as much in as possible while making it useable for the end user.

In context, a fiber optic channel is typically two fibers—one transmits and one receives. A channel is defined as a pair of fibers. A port is two fibers. With a cassette or module, there is a connector on the inside that is a multi-fiber connector that mates with the one that is plugged in and then it branches out with individual fibers to individual connectors in a front portion of a cassette.

There are primarily three optical fiber connectors (with mating adapters) used today: SC connector ("Sam Charlie"), the LC connector ("Larry Charlie"), and the Multi-fiber Push On ("MPO") connector. The common denominator footprint wise is the Sam Charlie adapter, which is the oldest and lowest density. One Sam Charlie connector will fit in an adapter space; two LCs will fit in the space; or an MPO will fit in the space. An MPO can have up to 72 fibers. The space being considered is a socket-looking space on the front as described further below. In many of the illustrative embodiments herein, the cutout in the module or cassette that accepts the adapters is based on the Sam Charlie cutout. The system may be modular to the component level so one can do as many applications as possible and efforts are made to keep the module as flexible as possible, so one can accommodate many applications.

In use with some illustrative embodiments, cassettes are positioned on sliding trays or shelves within a one rack unit space (RU). The dimension of an LC adapter that may be used in some embodiments is approximately ½ inch. By the time one puts some geometry around the adapter, and a sliding tray under the adapter, the most one can get in a RU space, e.g., an EIA/ECA-310-E and IEC 60297-3-100 Standard-compliant RU of 1.750" height, is three cassettes on multiple trays (e.g., three trays) in one rack unit. One could get four on a tray, which is 48 fibers on a tray by three and that would be 144 fibers in one unit and 72 ports in one unit. That is the maximum density in that kind of arrangement.

A challenge is that there are eight-fiber applications with the MPO connector, which typically accommodate as few as 8-fibers, up to 12-fibers and 16-fibers in a single row, and 24-fibers and up in multiple rows of 12-fibers. A "sweet spot" for the fiber count is often considered 96 ports or 192 fibers per one rack unit because that is evenly divisible between 8, 12, 16, and 24. One illustrative embodiment herein does that, and so the embodiment can cover many applications and intermix cassettes, e.g., eight port cassettes and 12 port cassettes on the same tray. Four 12-port cassettes on two trays may be done (i.e., 8 cassettes total; 96 ports, 192 fibers). Likewise, six 8-port cassettes on two trays may be done (i.e. 12 cassettes total; 96 ports, 192 fibers). In the embodiments that follow, a vertical divider or partition is added to the tray. The embodiments typically involve putting two trays in—not three—but double stacking the adapters within the cassettes so one can get three 8-port cassettes in a half tray, or two 12-port cassettes in a half. One can mix and match on a tray and one can have 8-port or 12-port cassettes.

In some embodiments, a pre-terminated solution is desired. In a data center, the pathways between racks, cabinets, and hallways are defined—between basket trays or ladder racks—so one can identify how far a cable needs to run. The trunk cables are often anywhere from 12 to 6912 fibers (576 12-fiber connectors on end) and it is advantageous to terminate connectors onto the cables in a factory. Set lengths may be built so that they can be plugged in. Flat panels with fixed, discreet adapters can be used but they are not flexible and not modular. Modular components are used in some embodiments. If one does not use pre-terminated trunks, one can use a cassette with splicing in the cassette.

With splicing, a stub cable is brought into a cassette pre-configured with pig tails, which would be a connector terminated to a short "tail" of fiber within the cassette and is spliced to the "tails" within the cassette. The illustrative embodiment shown herein in FIG. 1 can do either pre-terminated or spliced. An illustrative embodiment of the spliced option is what is presented further below in FIG. 14.

Some illustrative embodiments address, at least in part, how many ports one can get into the space. The illustrative embodiments herein focus on higher density arrangements. In some illustrative embodiments, a couple of significant aspects to this include a goose-neck feature (cantilevered front portion) and stacking the adapters with no geometry or items between them as will be described below. Other features are significant as well.

Referring now primarily to FIGS. 1-10, an illustrative embodiment of an optical-connector adapter cassette 100 is presented for use in an optical-connector shelf assembly. In this embodiment, the cassette 100 is a 8-port cassette—two rows 104, 108 of four adapters as may be seen on a front portion or section 112. Rows 104, 108 are stacked as shown. The adapter openings can accommodate SC, LC, or MPO adapters. In one embodiment, duplex LC adapters are used. A back portion or section 116, or rear portion, is opposite the front portion 112. If one has eight duplex LC adapters in the front 112 and a 16-fiber MPO adapter on the back 116, one would only need one adapter 120 on the back portion 116. If one feeds the cassette 100 with two eight-fiber MPOs, a second connector 124 in the back portion 116 would be needed and each adapter 120, 124 would feed a row 104, 108 on the front portion 112. In another embodiment, instead of four adaptors wide at the front portion 112, the cassette 100 may be six adapters wide and that would be a 12-port cassette. Six duplex adapters on row 104 and six below that (second row 108) may be used.

In FIGS. 1-10 the illustrative optical-connector adapter cassette 100 includes a housing 128 having a front wall 132 (FIG. 3), an opposing back wall 136, a first side wall 140, a second side wall 144, floor wall 148, a top cover 152. It should be noted that the directionally-oriented terms "top," "bottom," "side" and like are with respect to the orientation shown in the figures and are not meant to limit the disclosure or claims to a particular orientation. The "top cover" for example may be on the bottom with respect to the gravitational field but would still be referred to as the "top cover." The walls 132, 136, 140, 144, 148 and the top cover 152 form an interior space 156. The cover 152 is substantially rectangular in a top view. As described further below, the housing 128 is formed with a goose-neck section 160.

Figure 5:
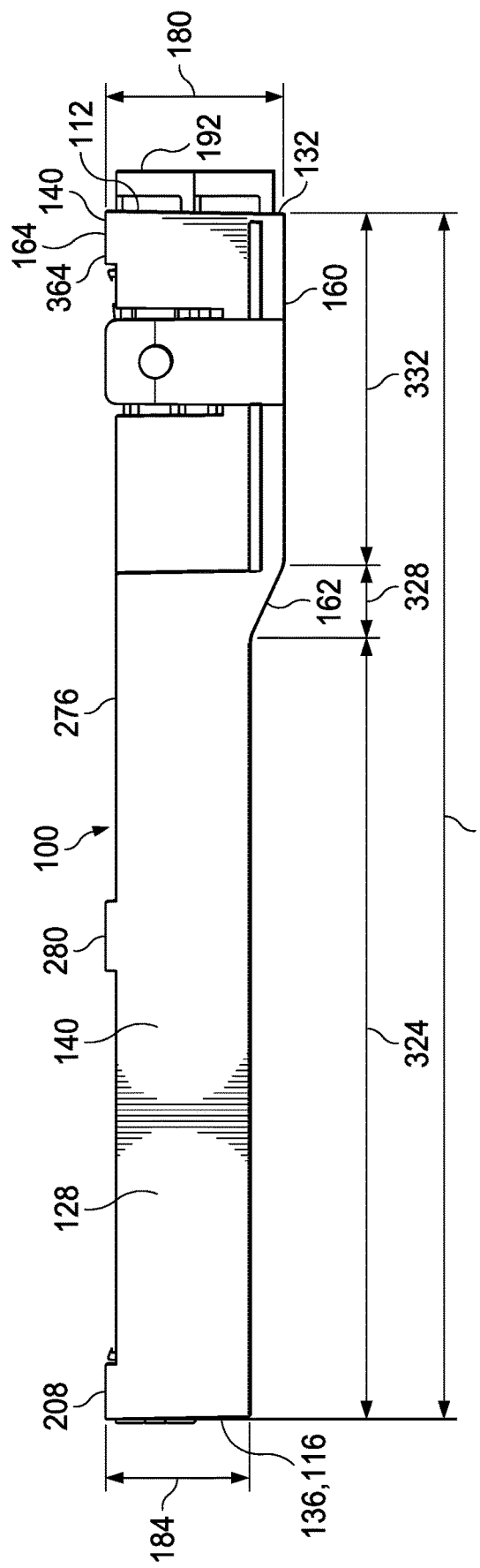
FIG. 5 is a schematic left elevation view of the optical-connector adapter cassette of FIGS. 1 and 2.

The first side wall 140 and second side 144 wall each have a front end 164, 168 and a back end 172, 176 separated by a longitudinal distance D (320 in FIG. 5). The front end 164 of the first side wall 140 and second side wall 144 both have a height H1 (180 in FIG. 5). The back end 172, 176 of the first side wall 140 and the second side wall 144 have a height H2 (184 in FIG. 5). With the goose-neck section 160, the relative heights are H1>H2. The height H1 180 extends along the first side wall 140 and the second side wall 144 toward the back end or portion 116 for a distance that is between 10% of D and 50% of D to form the goose-neck section 160 of the housing 128 at a front portion 112. The floor wall 148 (or bottom wall) may include bends, or angled portions, at locations to help accommodate the goose-neck section (see FIG. 9).

As used herein, "goose-neck" means a drop-down portion toward the front portion 112. The goose-neck may have an angled section or transition section 162 or could be a square drop. In some embodiments, the goose neck section 160 is a thicker portion at the front end that transitions from the thinner portion with an angled or transition section 162 that is approximately at 45 degrees from horizontal (for orientation shown). In some embodiments, the angle is between 20 and 60 degrees or any angle therebetween. On the bottom view (FIG. 8), one may see the start 236 (going from left to right in the drawing) of the transition or angled section 162 and that is where the tray would stop. The angled section 162 or portion in some embodiments is less than approximately 10% of D (longitudinal length between front wall and back wall) and greater than 2% of D. The angled section 162 is on a lower portion (for orientation in FIG. 6). In some embodiments, a transition section could be on both the top and bottom of the cassette body.

At least one multi-fiber cable adapter 120 is mounted with one or more openings 188 on the back wall 136 of the housing 128. The cassette 100 includes a plurality of fiber-optic adapters 192 mounted within openings 196 on the front wall 132 of the housing 128. Optical connections positioned within the interior 156 of the housing 128 connect the multi-fiber cable adapter 120 from an interior side and the plurality of fiber-optic adapters 192 again on an interior side.

In one illustrative embodiment, the cassette 100 is built as a molded box 145 and cover 152 that is releasably coupled to the molded box 145. The molded box 145 has latches 163, 167, 208, 212 that interact with the cover 152 to allow the cover 152 to be selectively released. The latches 163, 167, 208, 212 (shown clearly in FIG. 2) cooperate with a rail or edge portion of the cover 152, and, in particular, for this illustrative embodiment with access openings 215, 217, 220, and 224. In another embodiment, the cassette 100 is formed as plurality of coupled walls.

A portion of a latch 204 may include an indent or ball, e.g., 232, urged outwardly that coordinates with a matching receptacle, e.g., socket, or ball for releaseably latching. In some embodiments, the ball 232 snaps into socket 452 (see FIG. 13) on partitioning wall 448, or slide, to latch cassette 100 into the tray. In some embodiments, a ball and socket arrangement may be used with each latch having one member.

In some embodiments, the cassette 100 is modular and fits in one RU space. To accomplish this sizing, the adapters 192 on the front 112 are stacked line to line—one on top of another with nothing between them. In some embodiments, a thin member, e.g., 0.125 inches thick, is placed between them. In addition, as previously noted, instead of making the cassette 100 profile in elevation flat, the goose-neck feature or section 160 is included. The goose-neck section 160 allows additional depth at the front portion 112. As referenced further below, a support tray only runs a portion of the way and the goose-neck section 160 is cantilevered from the edge of the tray (see, e.g., FIG. 13). The tray stops at the goose-neck feature or section 160 during insertion of the cassette 100. The functionality is maintained while allowing more space on the front portion 112 for the rows 104, 108 of connectors or adapters 192. In some embodiments, the height of the back section 116 is approximately half of the height of the front section 112.

Figure 2:
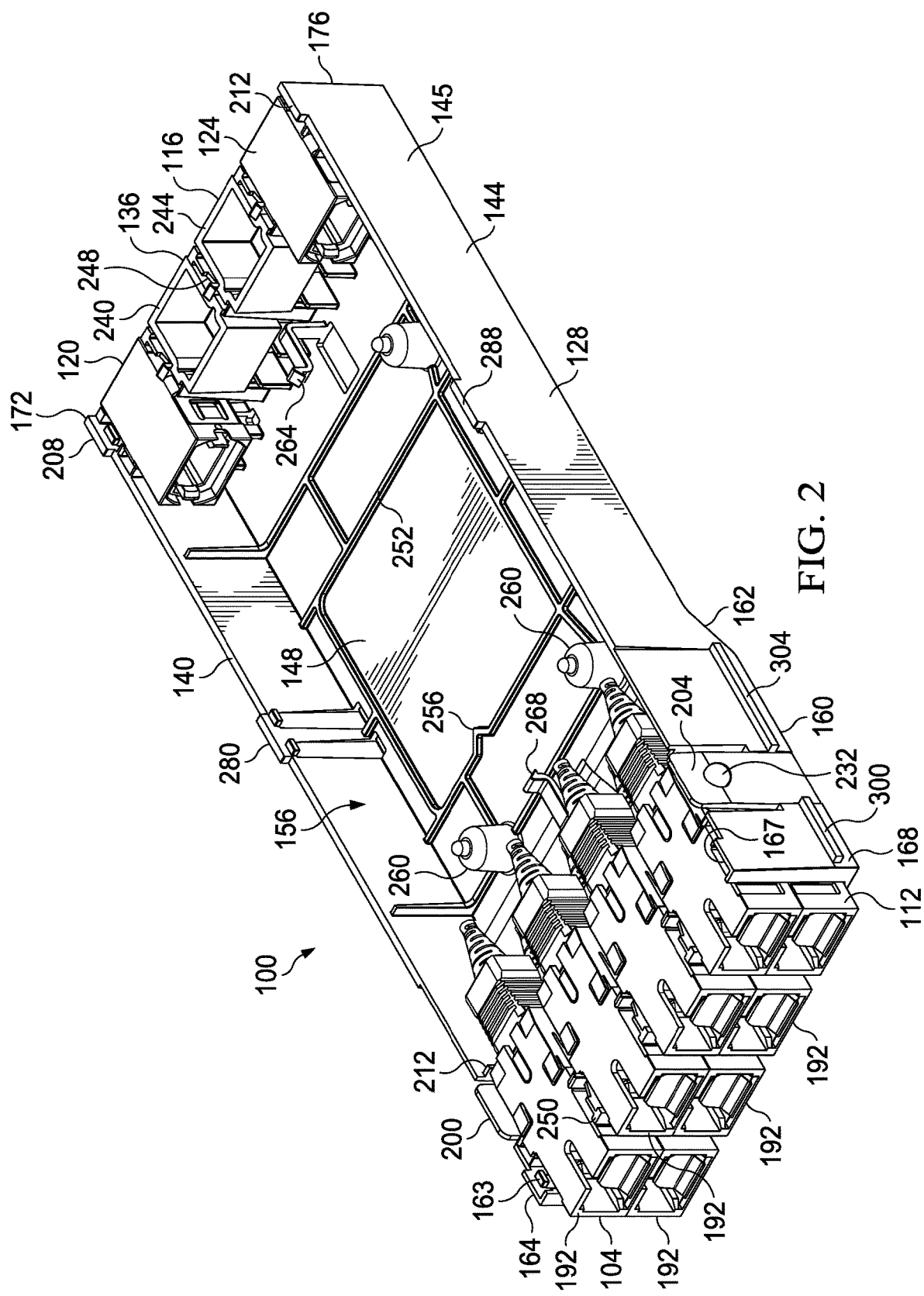
FIG. 2 is a schematic perspective view of the optical-connector adapter cassette of FIG. 1 with the top cover and interior fibers removed.
Figure 6:
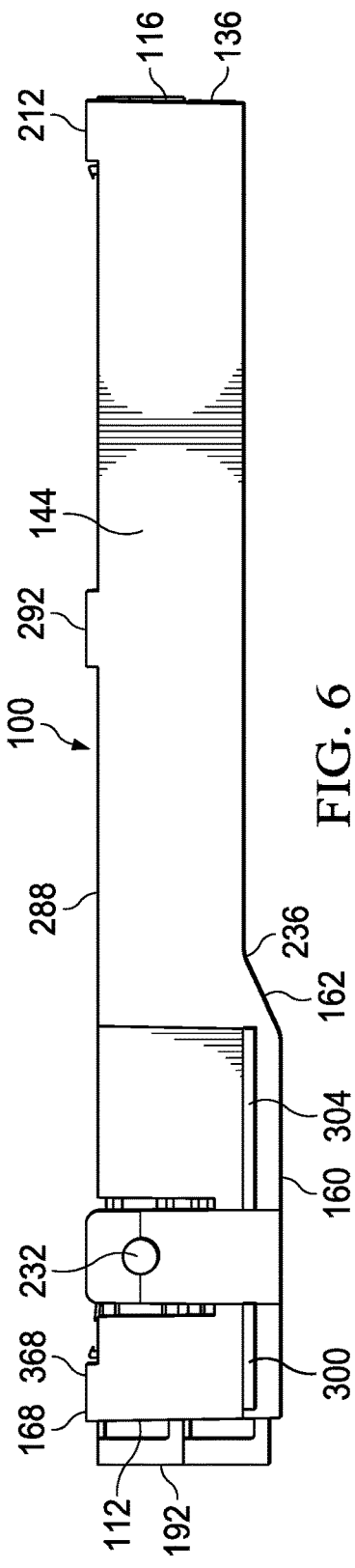
FIG. 6 is a schematic right elevation view of the optical-connector adapter cassette of FIGS. 1 and 2.
Figure 12:
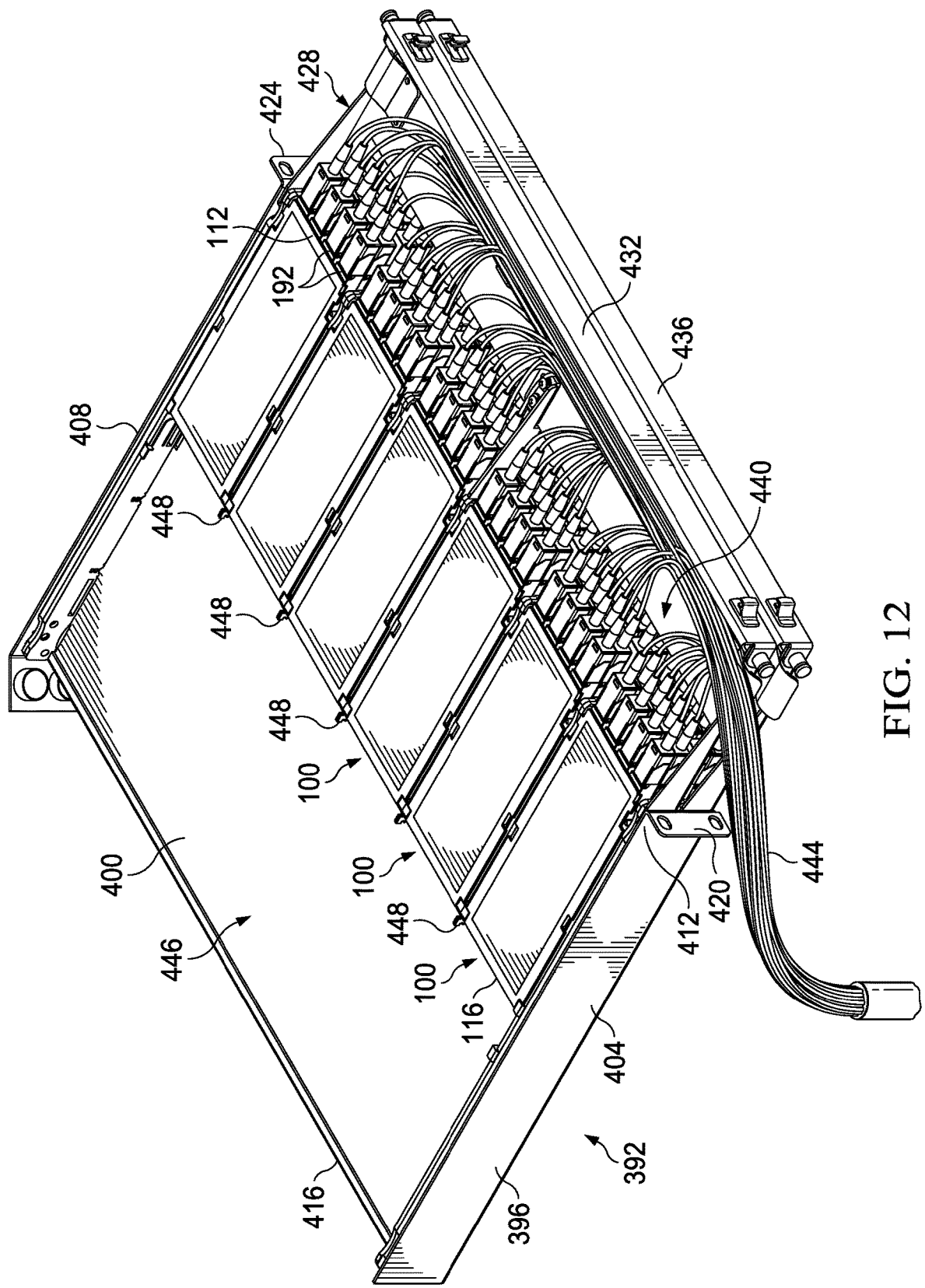
FIG. 12 is a schematic perspective view of an optical-connector shelf assembly according to an illustrative embodiment.
Figure 13:
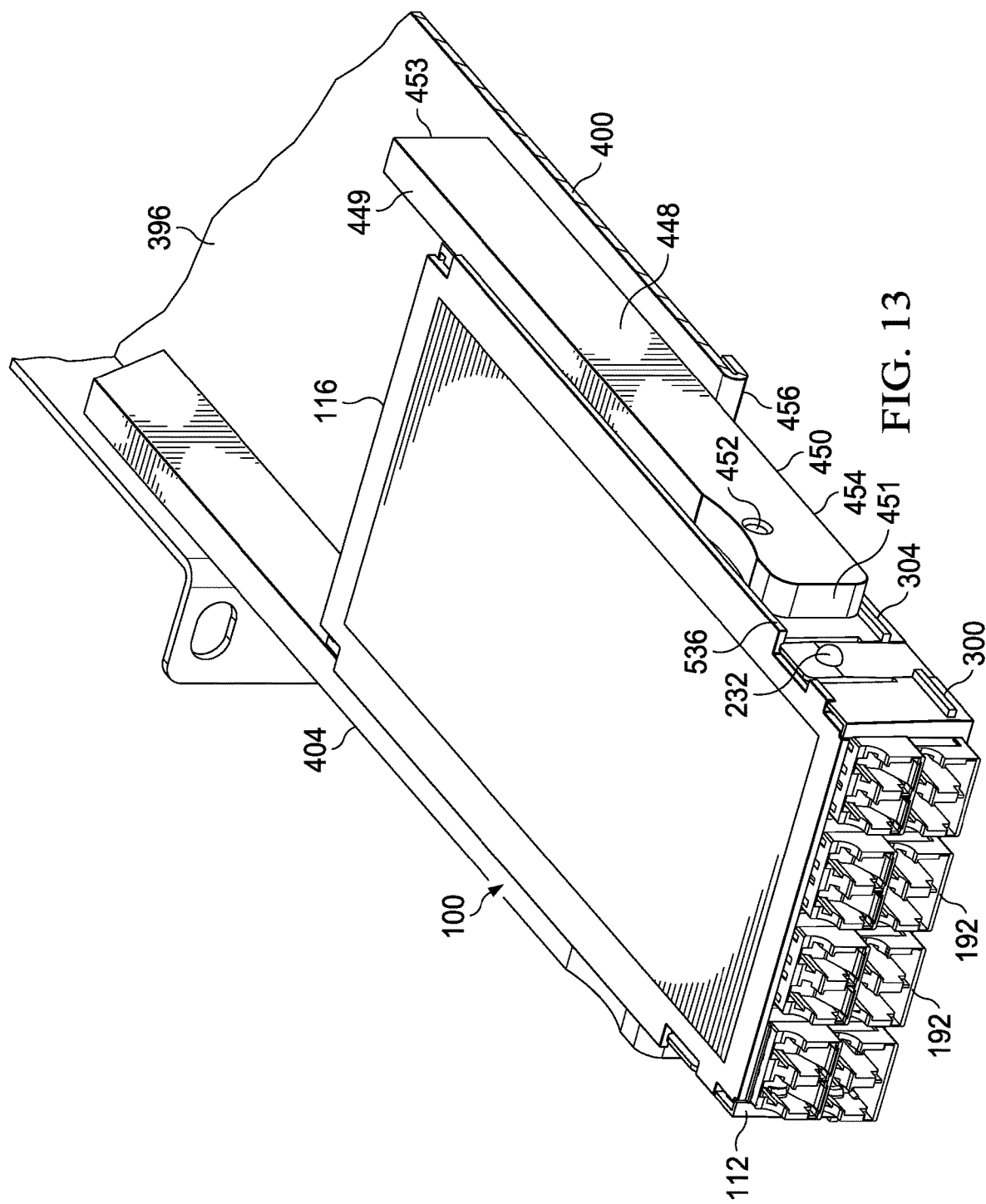
FIG. 13 is a schematic perspective view of a portion of an optical-connector shelf assembly according to an illustrative embodiment showing an optical-connector adapter cassette.

Referring now primarily to FIG. 2 and FIGS. 5 and 6, a top portion 276 of the side wall 140 has an extension member 280 that coordinates with a snap feature 284 on the cover 152 (FIG. 10) to align and releasably attach the cover to the housing 128. Likewise, a top portion 288 of the side wall 144 has an extension member 292 that coordinates with a snap feature 296 on the cover 152 (FIG. 10) to align and releasably attach the cover 152 to the housing 128. The housing 128 may include one or more slide rails 300, 304 for sliding on a shelf or tray at certain times. More particularly, in some embodiment, the slide portions 300 and 304 slide with respect to the bottom surface (for the orientation shown) of shelf partitioning walls 448 and 404 (FIGS. 12 and 13).

The front wall 132 and back wall 136 utilize common cutouts sized and configured so that one can put SC (Sam Charlies), MPOs, or duplex LCs in the front 112 or the back 116. The housing 128 is a molded body or molded box 145 or an assembled box. The cassette 100 is shown only partially populated with adapters—only two in the rear or back portion 116, eight in the front 112. The different openings or slots may be used with different adapters or combinations. This embodiment is shown with blank plugs 240 and 244.

The back wall 136 (and by analogy the front 132) may take many forms including a flat wall with cutouts or just having pillars or I-beams 248 that the adapters slide in between. Similarly, a plurality of pillars or beams 250 is also shown in this embodiment on the front wall 132. In this view, ribs 252 are shown and are provided for strength and to facilitate flow of the plastic in the mold. The ribs 252 also are used to position a splice holder if that is what one is building (see FIG. 15). A key 256 or alignment ridge may be used to align components. One or more integral standoffs 260 are provided that act as fiber routers and bend radius limiters and also are there to support a second floor when used in a splicing configuration. Snap features 264 and 268 hold the subfloor in some embodiments (see, e.g., FIG. 15, splicing application). A protrusion or latch 208 is used to fill in space for the cover 152. The member 268, which is a connector support, may be included that assists in holding the adapters 192 in place. As mentioned above, there are three different primary adapters, and while they have the same footprint, the adapter flanges or housings are slightly greater in width and so the flexible item or feature 268 is included, which may be like a leaf spring. The item 268 accommodates the different thicknesses of adapters 192 in the cassette 100.

Figure 3:
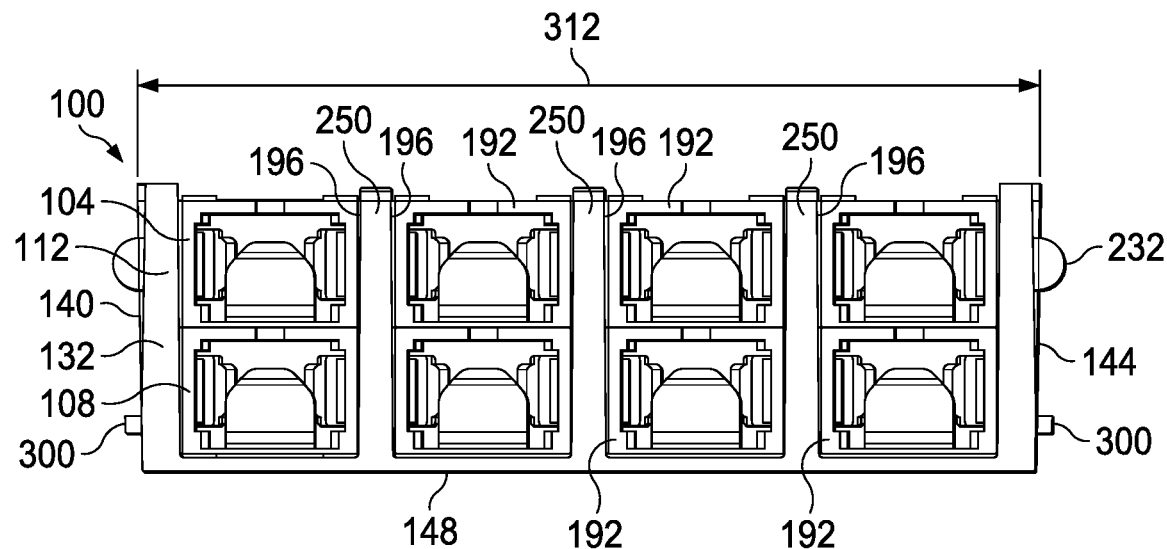
FIG. 3 is a schematic front elevation view of the optical-connector adapter cassette of FIGS. 1 and 2.

Referring now primarily to FIG. 3, a front elevation view of the cassette 100 is presented that shows the adapters 192 on the front portion 112. The adapters 192 are stacked in two rows with nothing between them at the front portion 112. In some embodiments, a thin spacer could be added, e.g., a few millimeters or less. In one embodiment, the width 312 of the front portion 112 is 2.70 inches and in others between 2.6 and 3.8 inches. It will be appreciated throughout this disclosure that different dimensions might be used in different situations.

Figure 4:
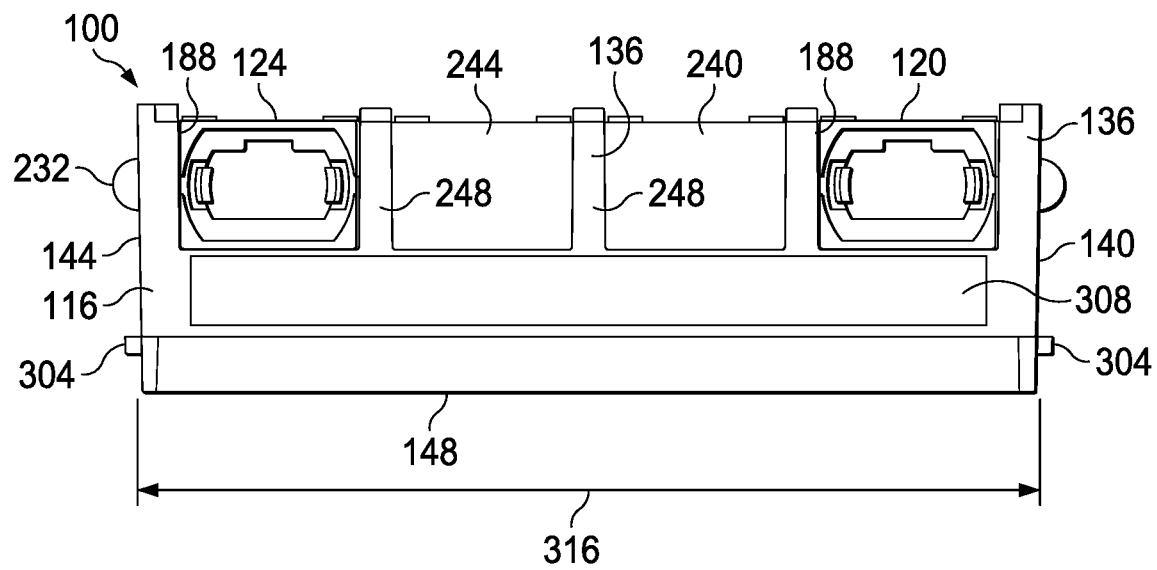
FIG. 4 is a schematic rear elevation view of the optical-connector adapter cassette of FIGS. 1 and 2.

Referring now primarily to FIG. 4, a back elevation view of the cassette 100 is presented that shows two adapters 120, 124 and two plugs 240, 244. The plugs 240, 244 fill a space when an adapter is not used in the available space. A label space 308 is provided on the back 116. In one illustrative embodiment, the width 316 of the back portion 116 is 2.6 inches, and in some embodiments, the width 316 is between 2.6 and 3.8 inches.

Referring now primarily to FIGS. 5 and 6, side elevation views of the cassette 100 are presented. The side wall 140 of housing 128 has a longitudinal length 320, or D. In one illustrative embodiment, D is 6.00 inches, and in another D is varied according to the applicable standard. A length 324 from the back wall 136 is where the start of the transition section or area 162 starts, and the transition area has a length 328. The distance of the final portion from the transition area or section 162 to the front wall 132 is 332. In one illustrative embodiment, a height 184 at the back is approximately 0.67 inches and the height 180 at the front is approximately 0.83 inches. It will be appreciated that in that embodiment, the goose-neck section 160 adds about 0.16 inches in height; that allows more connector space at the front portion 112. In some illustrative embodiments, the distance 328, or dimension, may be zero with a vertical transition.

Figure 7:
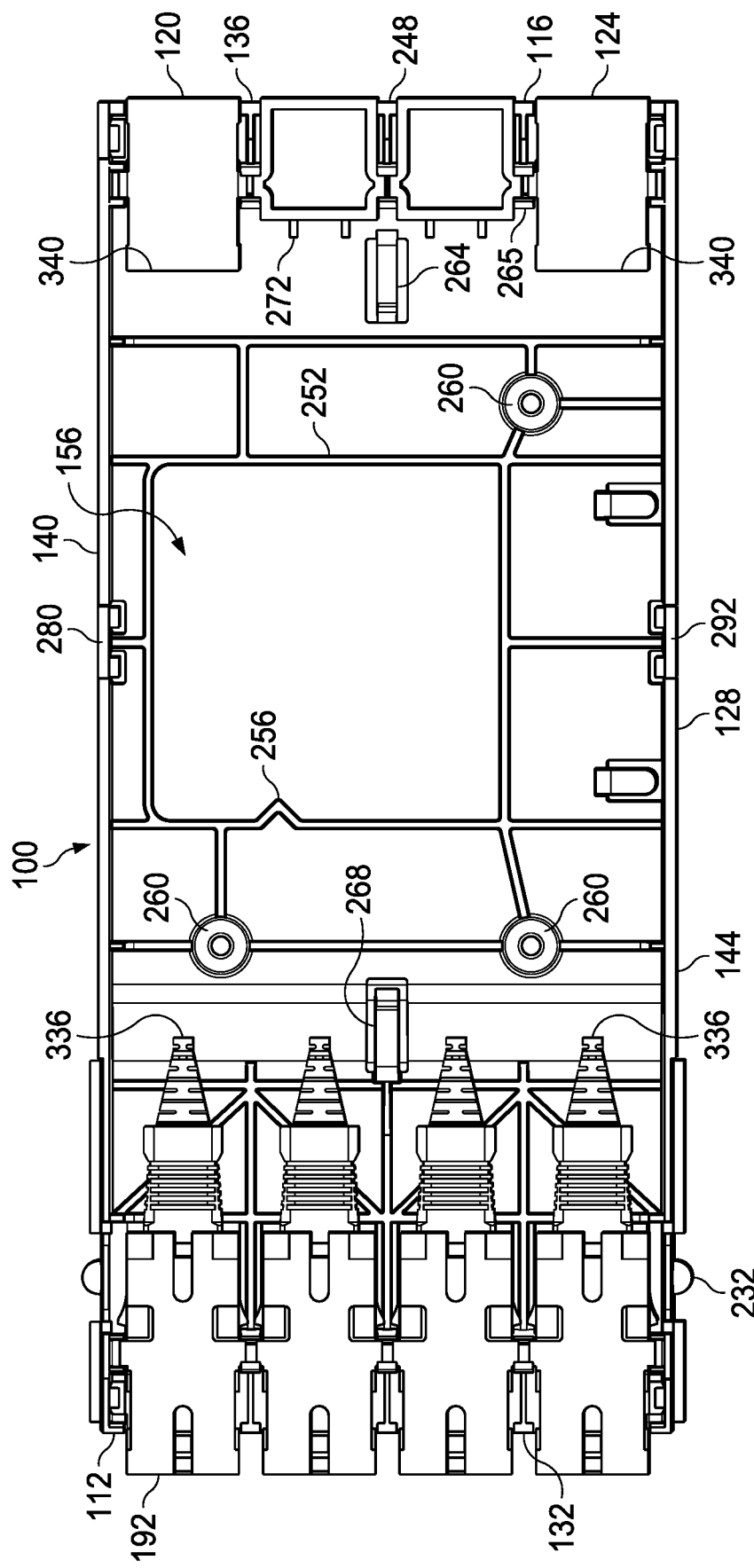
FIG. 7 is a schematic top plan view of the optical-connector adapter cassette of FIG. 2 with the cover and interior fibers removed.

Referring now primarily to FIG. 7, a top view of the cassette 100, with the top cover 152 removed and with connections on the interior removed, is presented. The interior connection ends 336 (shown with fibers removed) of the front adapters 192 are coupled to the interior connection ends 340 of the back adapters 120, 124 (see analogous connections 380 in FIG. 11) by fibers (not shown in this view). One can see the I-beams or pillars 248 in this view. The snap 268 is shown that can help hold adapters 192 in place and may support the sub floor 460 (FIG. 14) in some embodiments. The snap feature 268 is also a bend radius limiter that does a couple of things.

Figure 14:
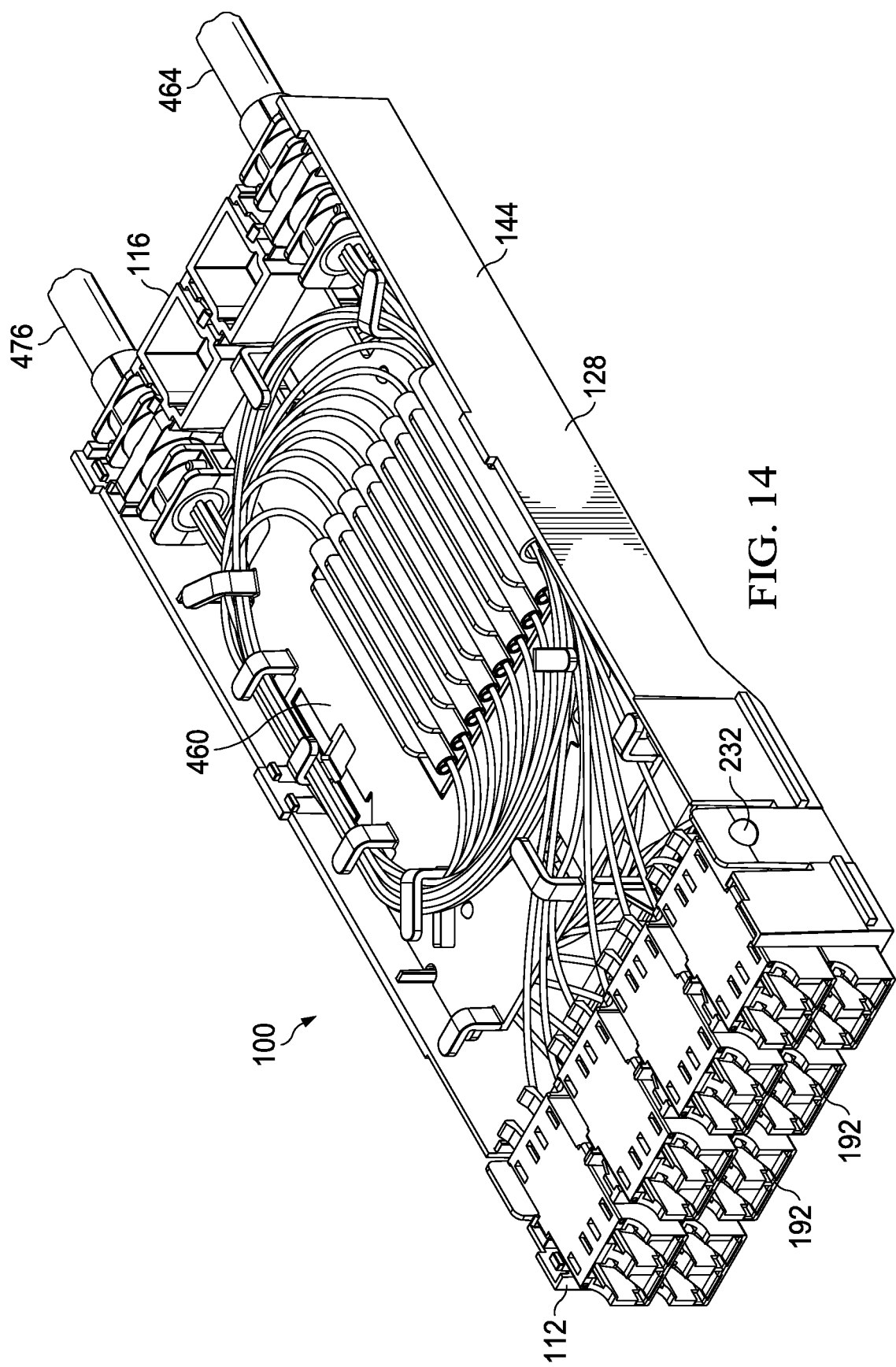
FIG. 14 is a schematic perspective view of an optical-connector adapter cassette according to an illustrative embodiment shown with its cover removed.
Figure 15:
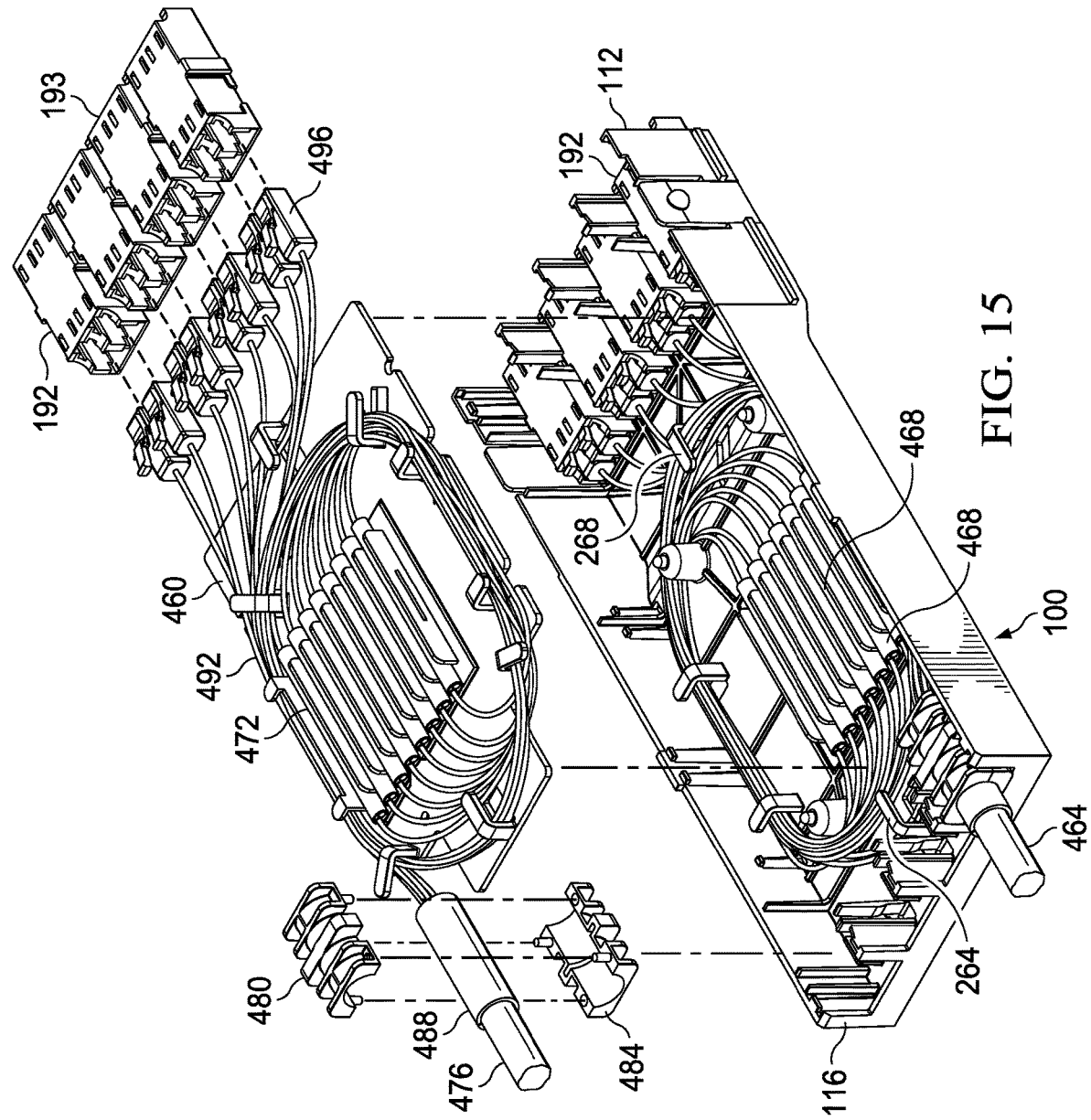
FIG. 15 is a schematic, partially-exploded perspective view of an optical-connector adapter cassette according to an illustrative embodiment shown with its cover removed.

The snap feature 268 is a bend radius limiter and, for the bottom row, keeps the fiber from going too far forward into the connector and connector boots. The snap feature 268 also manages the lower level and helps support the subfloor 460 (FIGS. 14 and 15). One or more anti-rattle members 265 may be included to reduce rattle. The anti-rattle members 265 are biased towards the rear portion 116 to help hold the connectors secure. Other anti-rattle members may be included at other locations, e.g., at the other end, front portion 112.

Figure 8:
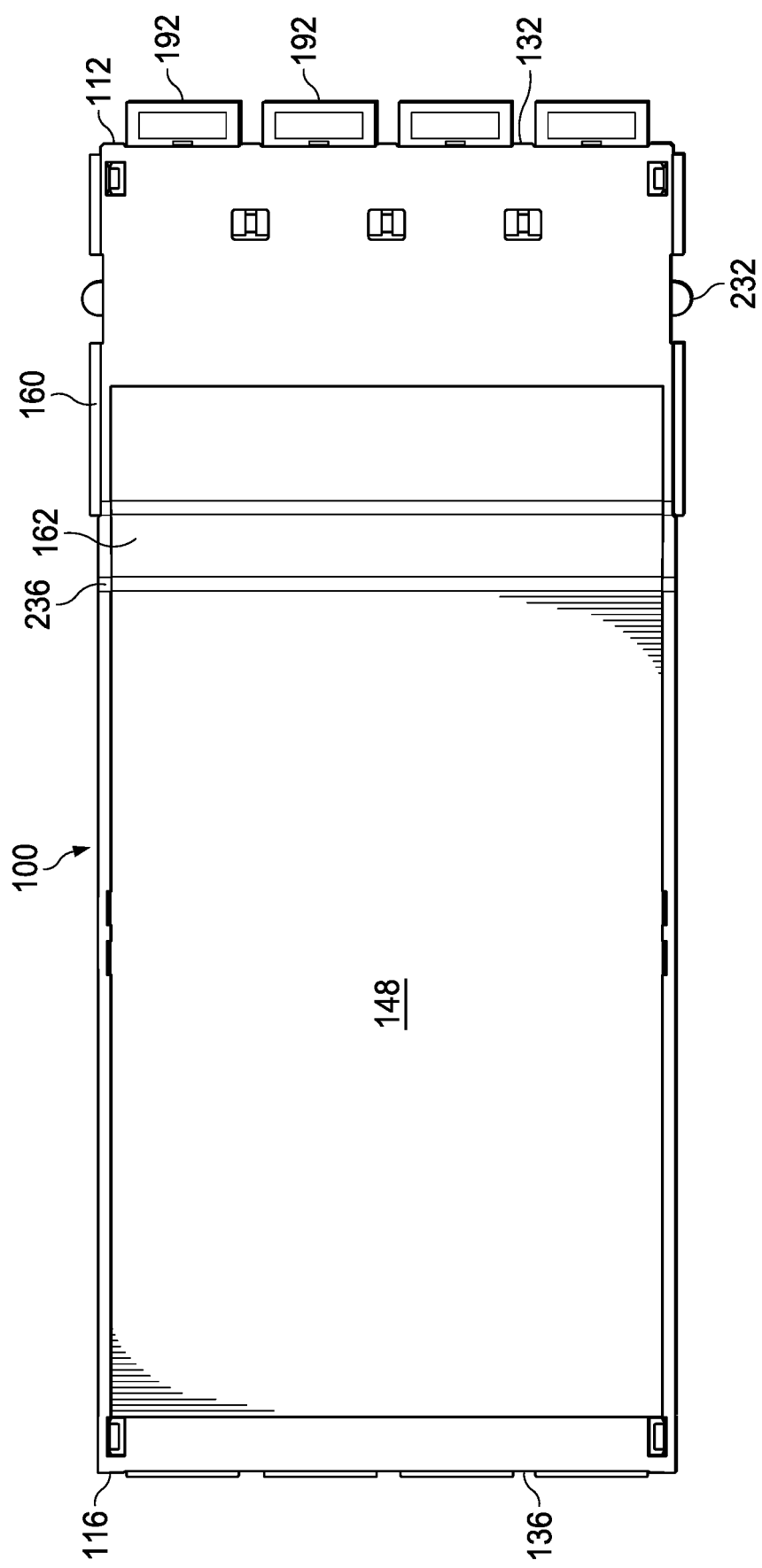
FIG. 8 is a schematic bottom plan view of the optical-connector adapter cassette of FIGS. 1 and 2.
Figure 9:
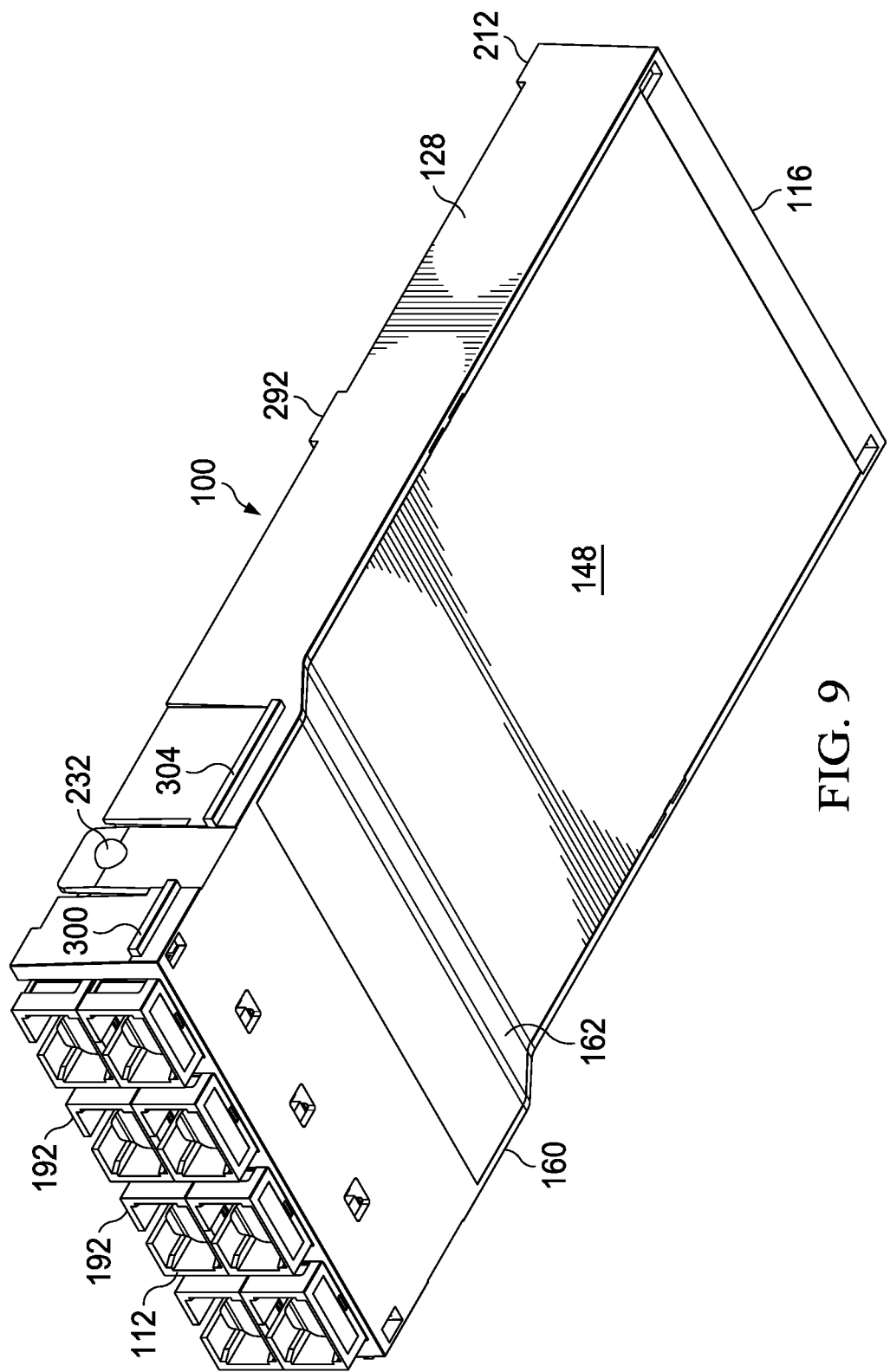
FIG. 9 is a schematic bottom perspective view of the optical-connector adapter cassette of FIGS. 1 and 2.

Referring now primarily to FIG. 8, a bottom view of the illustrative cassette 100 is presented. In this view, one may see the goose-neck section 160 starts with transition area 162 at 236. The goose-neck section 160 goes from the transition or angled section 162 to the front wall 132. The tray will end at 236 (see FIG. 13). This view clearly shows an exterior of the floor wall 148. Likewise, FIG. 9 presents the bottom, but as a schematic perspective view.

Figure 10:
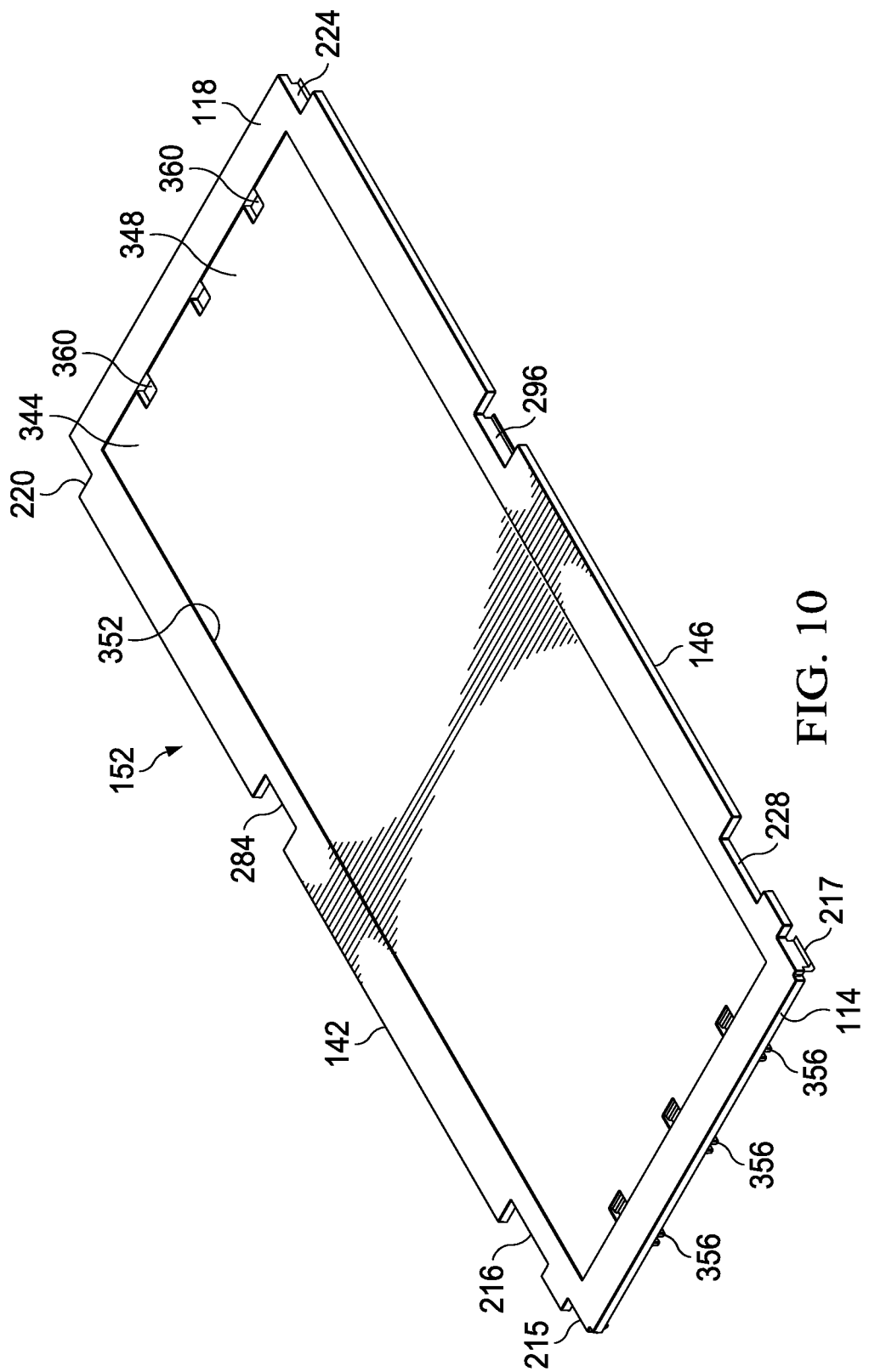
FIG. 10 is a schematic perspective view of the cover of the optical-connector adapter cassette of FIGS. 1 and 2.

Referring now primarily to FIG. 10, an illustrative embodiment of a cover 152, which is a top cover for the orientation of FIG. 1, for the cassette 100 is presented. The cover 152 has a generally rectangular shape. A top surface 344 may have a recessed portion 348 for receiving one or more product labels (not shown). The recessed portion 348 is represented by a perimeter step 352. The cover 152 has a front 114, a back 118, a first side 142, and a second side 146. A plurality of locating features 356 may be formed on the front 114 and a plurality of locating features 360 may be located on the back 118. The front 114 has access openings 216, 228 that align with projections 364 (FIG. 5) and 368 (FIG. 6) when in an assembled position (e.g., FIG. 1). The back portion 118 has access openings 220, 224 that align with latches or projections 208, 212 when in the assembled position.

The cover 152 includes features 356, 360 for aligning the cover 152 with the housing 128, e.g., 366 with I-beams or pillars 250 (FIG. 2). The top of latch 200 (FIG. 2) aligns with opening 216. Item 296 is a snap that will snap to the housing 128. Item 212 in FIG. 2 may help hold adapters in place. The cover 152 has a flat surface on a top surface 344 (FIG. 10) (for orientation shown) for a label. The cover 152 is also the upper surface of the slide when the cassette 100 goes into the rails, or partitioning walls, on the tray. To do this, the cassette 100 has a small lip or ledge (see, e.g., 536 in FIG. 18) formed at the periphery of the cover 152 for that purpose. The lip 536 is a portion of the cover that extends beyond the side walls. In some embodiments, the lip 536 extends approximately 1.3 mm beyond the housing 128 when assembled.

Figure 11:
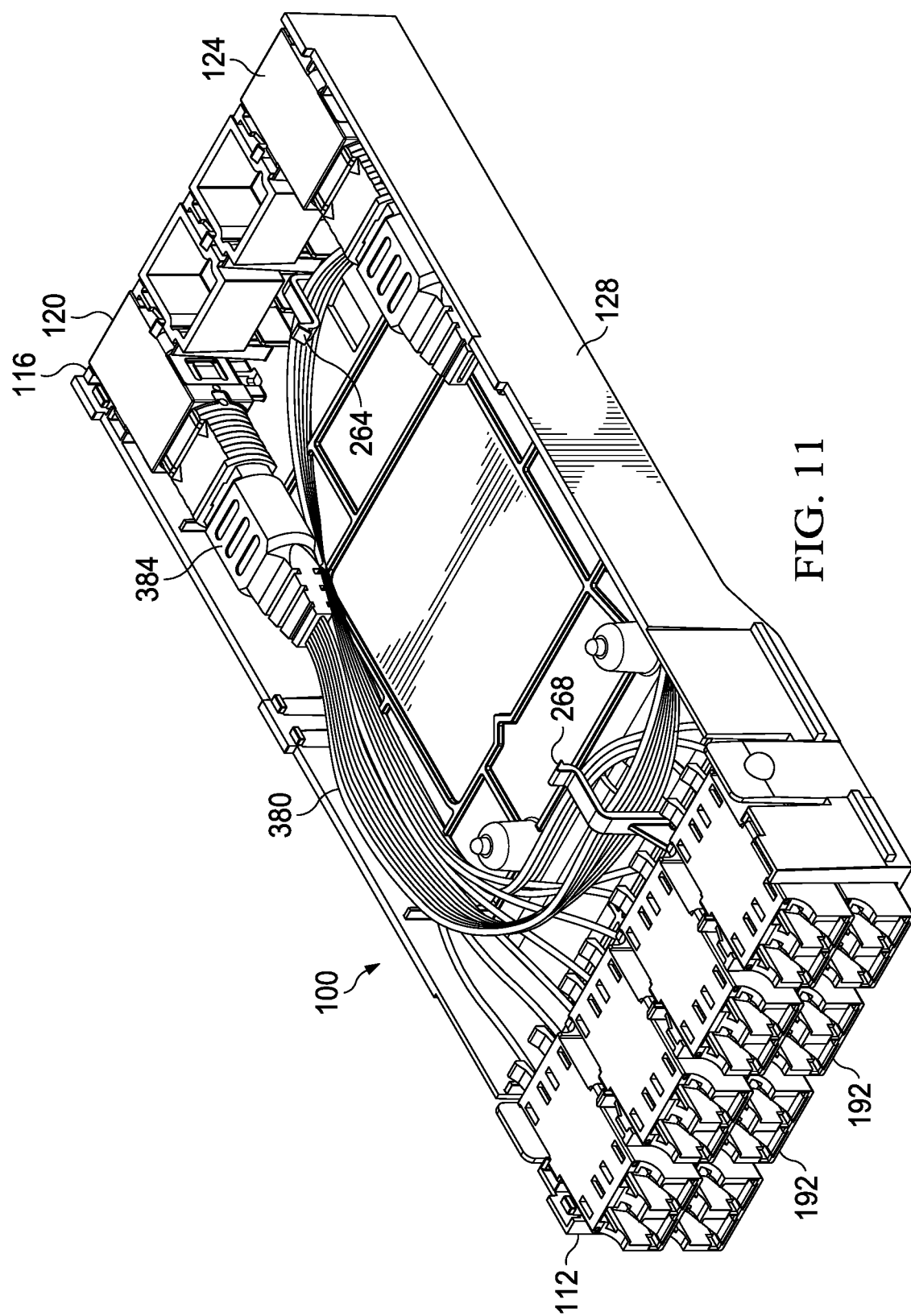
FIG. 11 is a schematic perspective view of an optical-connector adapter cassette according to an illustrative embodiment shown with its cover removed.

Referring now primarily to FIG. 11, another illustrative embodiment of an optical-connector adapter cassette 100 with the cassette's cover (which is analogous to cover 152) removed is presented. This embodiment is analogous to the previously-presented embodiment in most respects. This embodiment is shown at the front portion 112 with adapters 192 taking the form of duplex LC adapters. The interior optical fibers 380 going from adapters 192 on the front portion 112 to adapters 120 on the back portion 116 are shown. This embodiment shows how the snap features 264 and 268 may also help with the positioning of the interior optical fibers 380. An interior connector 384 is coupled to the back adapter 120.

Referring now primarily to FIG. 12, an illustrative embodiment of a plurality of optical-connector adapter cassettes 100 in a patch panel 392, or termination panel or shelf, is presented. The patch panel 392 may be mounted to a telecommunication equipment rack. The patch panel/shelf 392 comprises an enclosure 396 (shown without its cover attached on top for orientation shown) having a first enclosure side wall 404 and a second enclosure side wall 408. The enclosure 396 includes a first tray 400, or shelf. While only one tray 400 is clearly visible, it should be understood that a second tray 398 (see FIG. 18) may be included below the first tray 400. Each tray 398, 400 may have slides or partitioning walls 448 (FIG. 13) or a means to selectively allow the cassettes 100 to slide and be held in position. The enclosure 396 has a front portion 412 and a back portion 416. The first enclosure side wall 404 may have a flange member 420, which is substantially perpendicular to main lateral portion of the side wall 404, for attaching to the equipment rack or enclosure. Likewise, the second enclosure side wall 408 may have an analogous flange member 424 for attaching to the equipment rack or enclosure.

Proximate the front portion of the enclosure 396 is a trough assembly 428. The trough assembly 428 includes trough doors 432 and 436 for selectively gaining access to the trough area 440 and the front portion of the cassettes 100. The trough doors 432 and 436 may pivot about a lower (for orientation shown) edge. Again, there are two troughs, but only one is visible in this view. The troughs allow fiber patch cords 444 to enter the trough area 440 and for fibers to be dispersed to the plurality of adapters 192 of the cassettes 100. A back portion 416, or rear portion, provides an open shelf area 446 for receiving input cables that would go to the adapters, e.g., 120, 124, on the back of the cassettes 100.

A plurality of intermediate shelf partitioning walls or slides 448 may be included to provide slideable attachment of the cassettes 100. In one illustrative embodiment, some of the intermediate shelf partitioning walls 448 may be removed or repositioned to allow other cassette formats to be installed on the same tray. This can be seen more clearly in FIG. 13. A center tray partitioning wall 448 (or slide) may remain fixed, in some embodiments, to accommodate mixing of cassette formats on the same tray in half-tray increments; mixed format cassettes may still deliver 96-ports per 1RU when mixed within a tray and within a 1RU panel/enclosure.

Referring now primarily to FIG. 13, a portion of the enclosure 396 is shown. The enclosure 396 has the first enclosure side wall 404, which is a partitioning wall analogous to 448, on one side and the shelf or tray partitioning wall 448 (or slides or slide rails) on the other. The tray partitioning wall 448 and a portion of the side wall 404 may have indentions (or partial ball-shaped receptacles or sockets) that are sized and configured to mate with a portion of a ball 232 or indention on a side surface of the partitioning wall 448 or side 404. The tray 400 may include a plurality of partitioning walls 448 between the enclosure walls 404, 408.

Each of the partitioning walls 448 may be formed as a longitudinal member that has a top edge 449, a bottom edge 450, a front end 451, and a back or rear end 453 for the orientation shown. A portion of the partitioning wall 448 overlaps on the bottom edge 450 with the top surface of the tray 400 and is secured thereto with fasteners, molding, glue, epoxy, or other attachment means. In some embodiments, fasteners extend through the tray 400 into the partitioning wall 448 through the bottom edge 450. The overlap is partially to intentionally form a cantilevered portion 454. At least a portion of the cantilevered portion 454 along the top edge 449 interfaces with the lip 536, and the slides 300 and 304 interface with the bottom edge 450 of the partitioning wall 448. The tray 400 has a leading or front edge 456 that hits the transition area 162 (see, e.g., FIG. 2) of the gooseneck section 160 or transition area of the cassette 100 when fully moved forward.

Now referring primarily to FIGS. 14 and 15, a splicing configuration of an illustrative embodiment of an optical-connector adapter cassette 100 is presented. FIG. 14 is a front, top perspective view with the cover 152 removed, and FIG. 15 is an exploded view (again with cover removed) showing two layers or floors of the cassette 100. A subfloor, or substrate, 460 partitions the interior at least in part. FIG. 14 shows the components on the subfloor 460, and FIG. 15 allows the subfloor 460 and below the subfloor 460 to be seen. Apart from components for addressing splicing, the cassettes 100 of FIGS. 14 and 15 are analogous to those previously presented in FIGS. 1-13.

A cable 464, or stub cable, is brought in, routed, and spliced on the lower level (below subfloor 460) at the back portion 116, or rear. In this illustrative embodiment, there are eight individual splices per level. Reference 112 is the front where the adapters are positioned, e.g., adapter 192. The splice holders or splice sleeves 468 and 472 are shown. In one illustrative embodiment, the splice sleeves are 40 mm×03 mm, but other sizes may be used as one skilled in the art would understand. The stub cable 464 is introduced on the back section 116 of the cassette 100 and is spliced to terminated pig tail leads that are already connected to the adapters 192. The cable 464 is introduced and snaps into a feature to secure the cable to the cassette 100 and is routed, spliced, and then the fiber is dressed into the radius-management features in the cassette 100. Then the subfloor 460 is positioned over the connections and splices on the next level are done in the same manner.

With the next level of connections (which is a top level for the orientation shown), the fibers from cable 476 are introduced into the interior above the subfloor 460. The cable 476 may include cable retainers 480, 484 and may include a latex or rubber wrap 488 for grip. The cables used may vary with application and dimensions as desired. In one embodiment the fibers, e.g., fiber 492, is a 900 µm A1 single mode fiber but other cables may be used as those skilled in the art will appreciate.

The connectors 496 that interface with adapters 193 are visible in this exploded view. One could bring a 16-fiber cable in and divide the terminations to accomplish eight connections in each row of adapters. Generally, however, two groups of eight would be done on each floor. One would do the same with a 12-port cassette; one would have 6 adapters and a little bigger splice holder that would hold 12 splice sleeves and then repeat the process on the next floor to complete the density.

As previously suggested, the size of the cassette 100 and features on the cassette 100 are determined by the premise that one is using A-1 single mode fiber with 900 micron buffered fiber. There are other fibers and one could use, but this embodiment contemplates A-1 or better.

Figure 16:
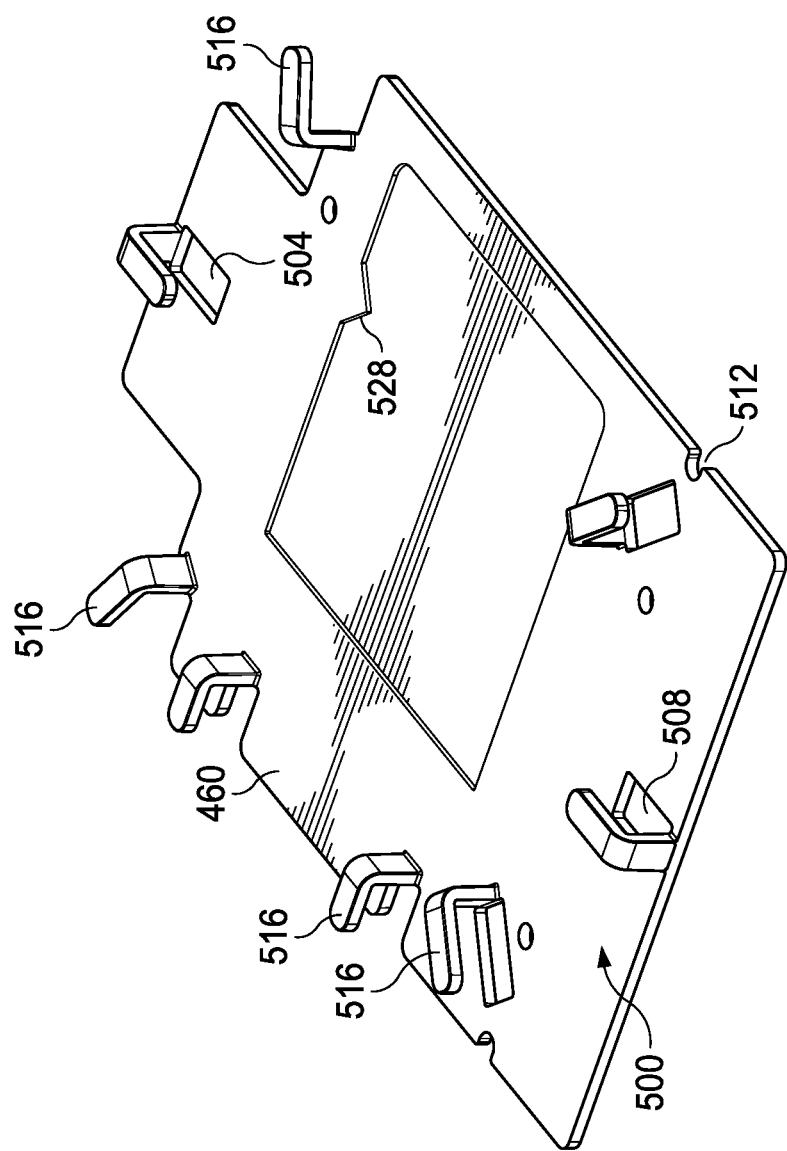
FIG. 16 is a schematic perspective view of a subfloor for use in an interior of an optical-connector adapter cassette according to an illustrative embodiment.

Referring now primarily to FIG. 16, a detail of the subfloor 460 is presented. The front of the subfloor 460 is shown at 500. Latches, or snap features, 264, 268 come through apertures 504 and 508, respectively. Notch 512 in the subfloor 460 helps position the floor 460 as the subfloor 460 is maneuvered around a rib on the inside of the housing—helps guide the subfloor 460. A plurality of fiber guides 516 may be used to position the fibers.

Figure 17:
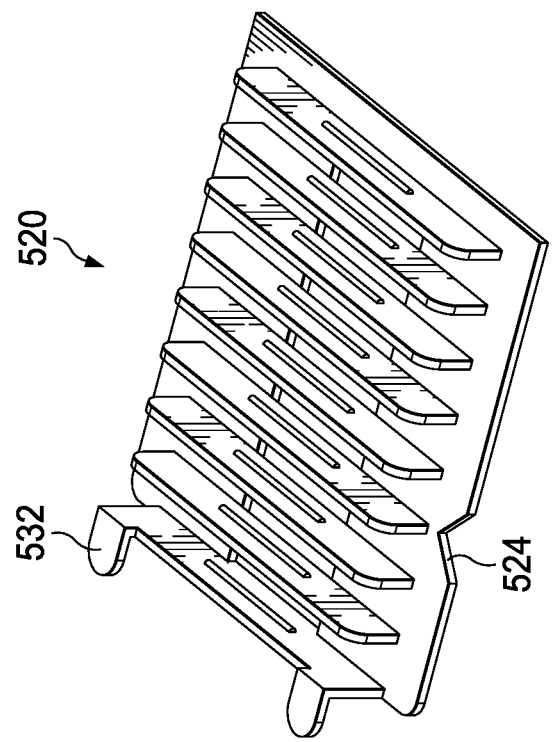
FIG. 17 is a schematic perspective view of a convertible splice sleeve holder for use in an interior of an optical-connector adapter cassette according to an illustrative embodiment.
Figure 17:
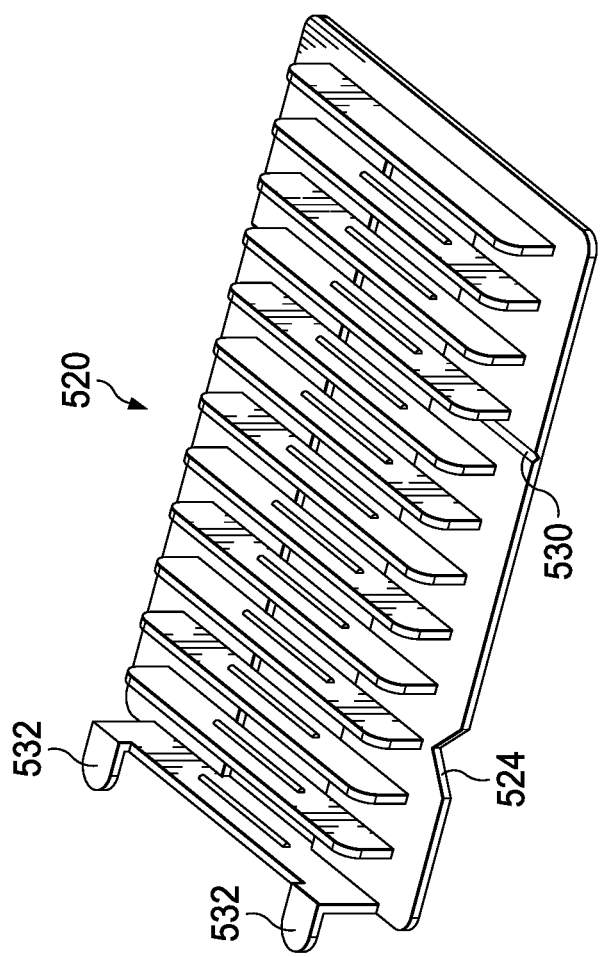

Referring now primarily to FIG. 17, a convertible splice sleeve holder 520 is shown. The convertible splice sleeve holder 520 secures splice sleeves after fibers have been spliced. The keying feature 524 matches up the arrow feature 528 (FIG. 16) on the subfloor 460 and on the regular floor. In the factory or field, the molded convertible splice sleeve holder 520 can be snapped off at location 530, or break line, to form an eight-position holder. The left portion of FIG. 17 shows the full sleeve holder 520 (12-position holder) and the right portion shows a sleeve holder 520 after the sleeve holder 520 has been snapped at location 530 to reduce the sleeve holder 520 in capacity (eight-position holder). The snap location 530 may have a thinned area or indentions or perforations to facilitate snapping. Extension members 532 may be used to secure the sleeve holder to the housing.

Figure 18:
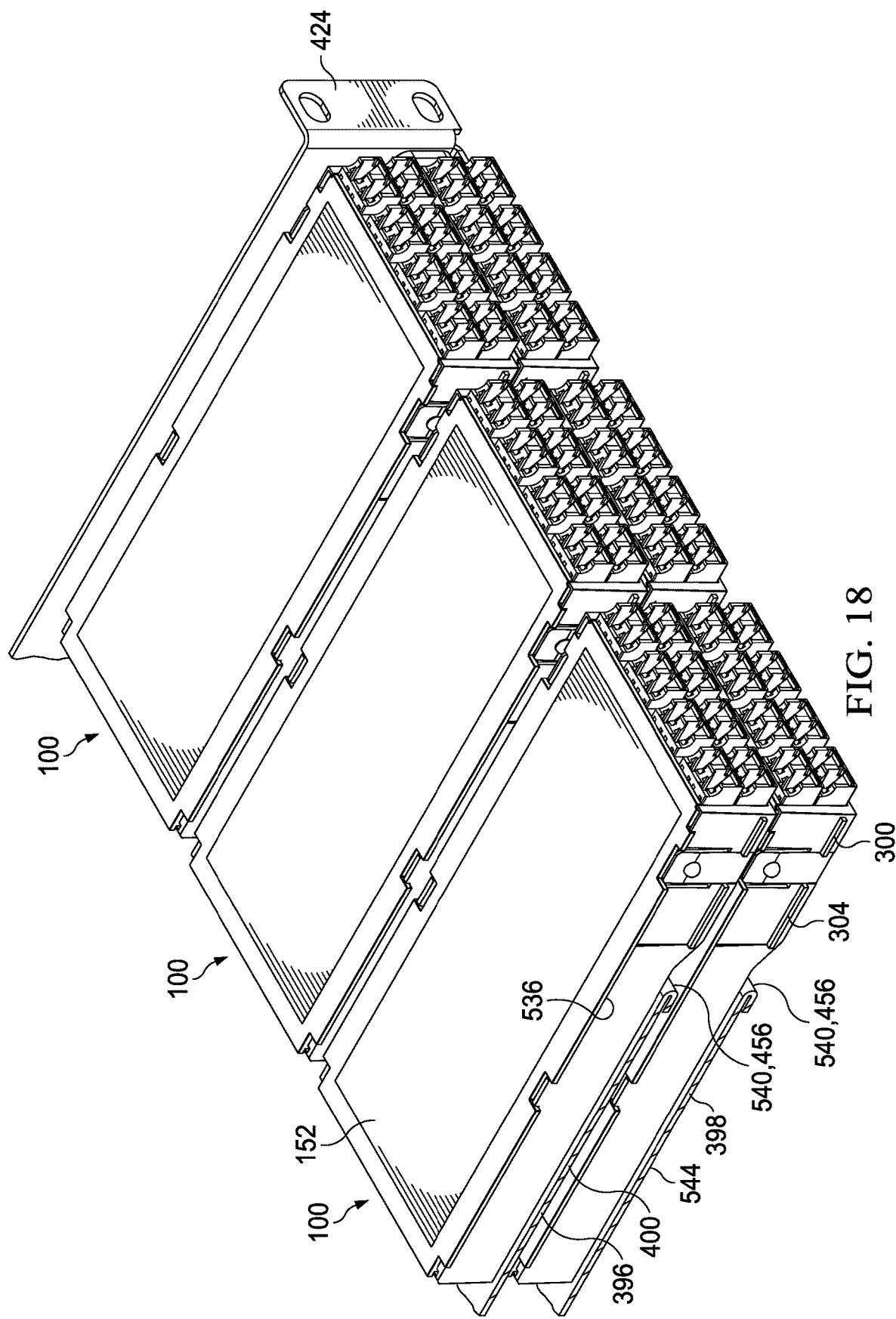
FIG. 18 is a schematic perspective view of a portion of an optical-connector shelf assembly according to an illustrative embodiment.

Referring now primarily to FIG. 18, a plurality of cassettes 100 is shown on trays 398, 400 as part of the slide. In this view, the overhang or lip 536 of the cover 152 is shown. Slide portions 300 and 304 are also visible. In this embodiment, the plurality of cassettes 100 comprises six cassettes (3×3) shown in position for this partial view. Each cassette 100 is substantially half of a one RU shelf in height at the front, and in the figure, the shelf is shown split down the middle; that is the left portion of the tray/shelf in the view has been removed at a mid point. Each tray 400, 398, or shelf, has three cassettes 100; so that is half a shelf (cf. FIG. 12 with six across). There is a hem 540 formed at the front edge 456 on the upper tray and lower tray.

In each instance, the tray 400, 398 is cut short longitudinally; in other words, the tray 400, 398 does not extend to the front itself of the assigned space but supports a cantilevered portion of the cassettes 100 that extends without a shelf under the front portion of the cassette 100 to the trough area or patch field. The cassette 100 is cantilevered beyond where the shelf ends proximate the hems 540. The dimension from the end or edge 456 of the tray to the patch field (e.g., 332+328 in FIG. 5) is determined by the depth of the adapter and the connector that plugs into the adapter. There are standards that apply to the connector body and the boot that define how far one can go before doing a bend. The flange or outer structure 424 on the side of the shelf is used to attach the shelf to the rack channel. The second tray has a bottom portion 544.

In one embodiment, the optical-connector adapter cassette and the second optical-connector adapter cassette are disposed on a plurality of trays with the floor wall of the first optical-connector adapter cassette proximate to the cover of the second optical-connector adapter cassette. "Proximate" as used here means the items are near and could touch but do not have to touch. In some embodiments, proximate means that they are within 0.125 inches or closer. In some embodiment, proximate means within 0.2 inches.

Figure 19:
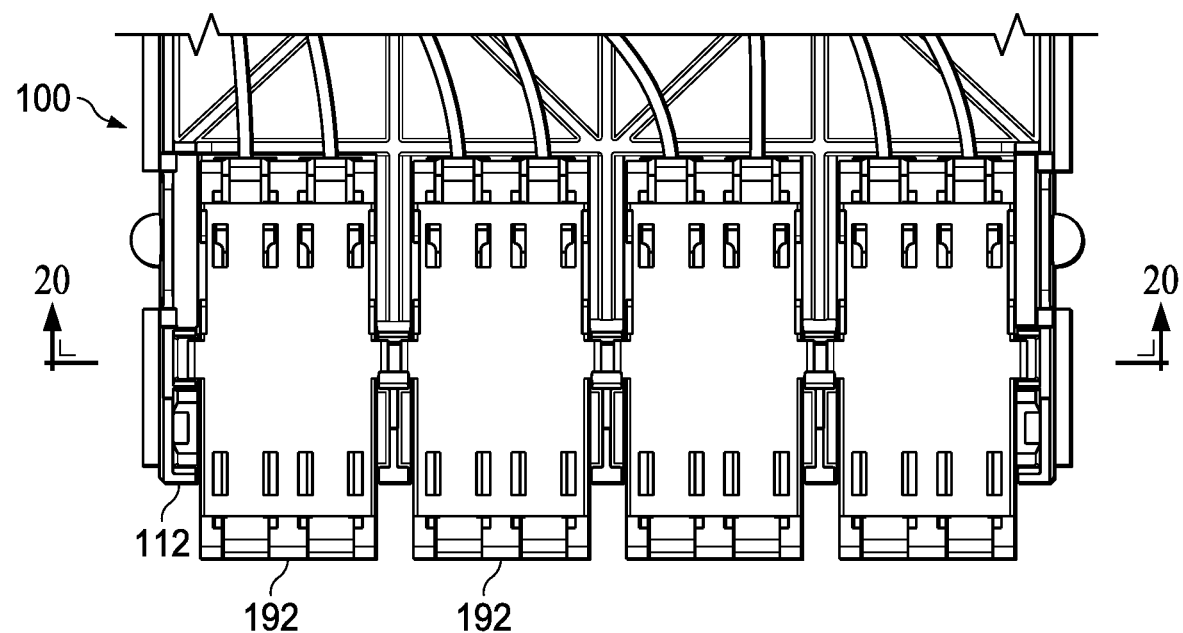
FIG. 19 is a schematic top view of a front portion of an optical-connector adapter cassette according to an illustrative embodiment.
Figure 20:
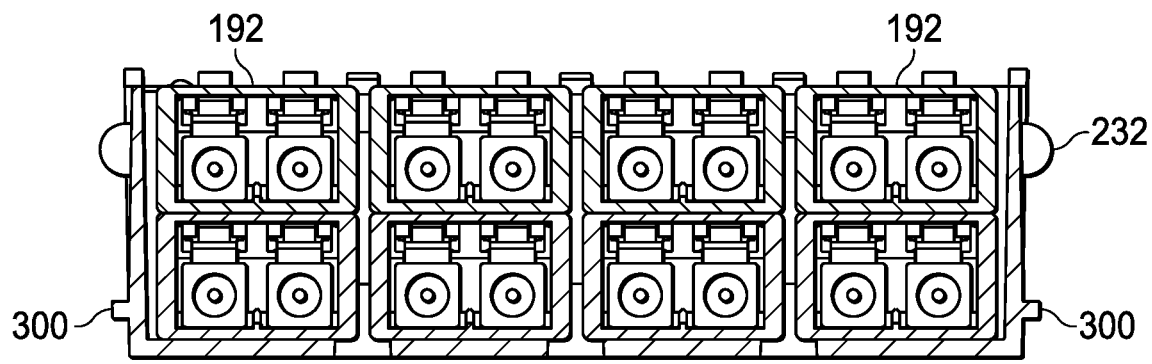
FIG. 20 is a schematic cross section of the optical-connector adapter cassette of FIG. 19 taken along line 20-20.

Referring now primarily to FIG. 19, a top view of another illustrative embodiment of an optical-connector adapter cassette 100 is presented. The cassette is analogous to those previously presented. FIG. 20 is a portion of the cassette 100 of FIG. 19 taken along section line A-A.

The cassettes herein may be used with optical interconnect circuits because of the uniform dimensions. The optical interconnect circuits take the place of loose-fiber breakouts. The flexible optical interconnect circuits may be used to facilitate more efficient fabrication. In some instances, optical fibers are bonded between two flexible substrates or a surface of a substrate or subfloor. In some illustrative embodiments, a substrate includes an optical fiber. A robotic application may be used once the pattern is uniformly established for the cassette. The robot may lay the optical fiber almost like in optical printing. The robot sets out the optical fibers—spools it out—and lays the fiber on the substrate in a definable and repeatable pattern. This is made possible because of the uniformity of the cassette 100. An illustrative example is now presented.

Figure 21:
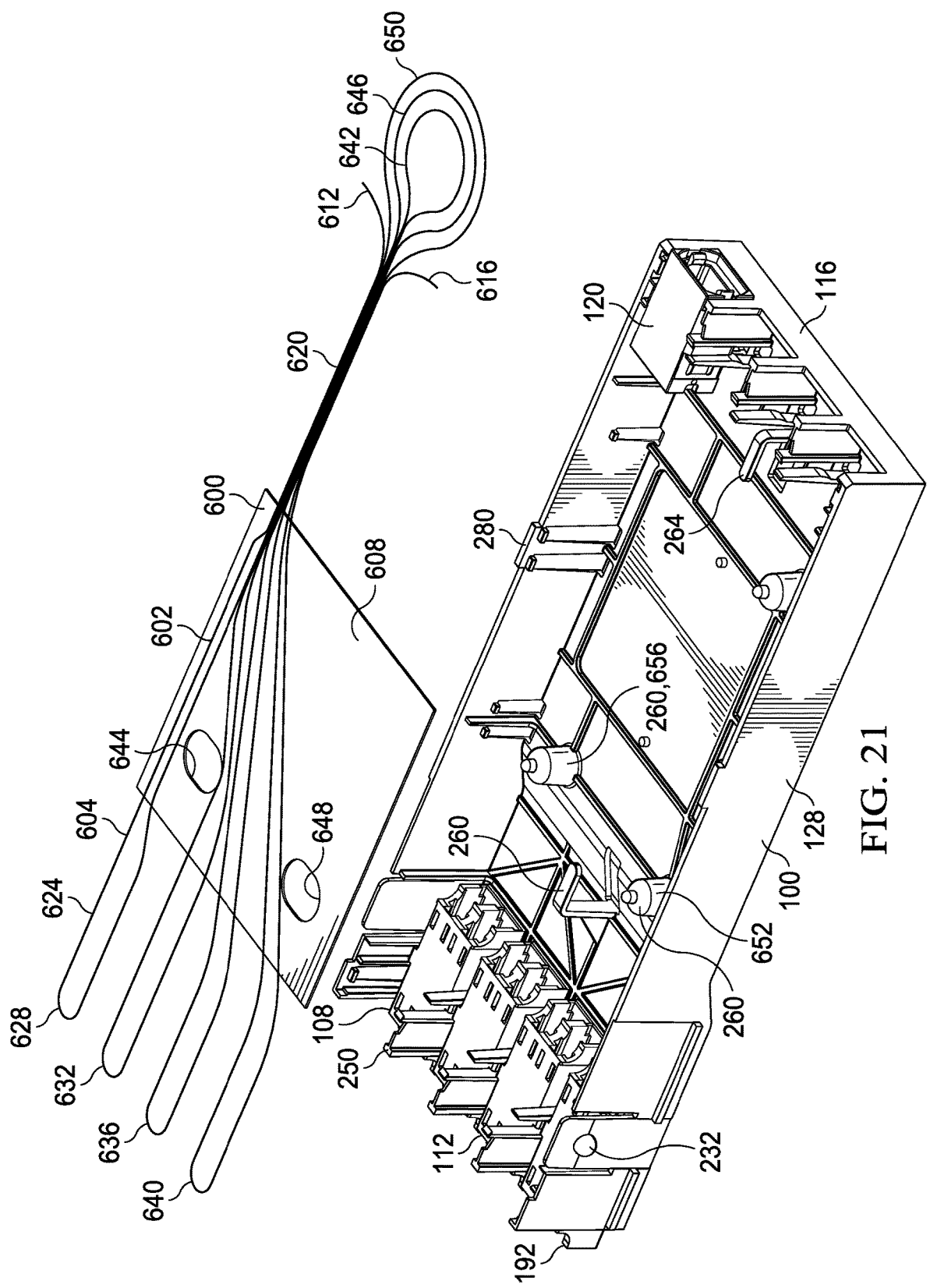
FIG. 21 is a schematic, partially-exploded perspective view of an optical-connector adapter cassette according to an illustrative embodiment with its cover removed and showing at least a portion of an optical interconnect circuit.

Referring now primarily to FIG. 21, an optical-connector adapter cassette 100 is presented that includes a substrate 600 for holding an optical interconnect circuit. The optical fiber 604 is placed on a first surface 608 of the substrate 600. The cassette 100 is analogous in most respects to embodiments presented above and like numerals have been used and may not be further described.

The substrate 600 is shown as rectangular member, but those skilled in the art would understand that the substrate 600 might take many different shapes. The substrate 600 may be covered with a laminate that may be sprayed on the substrate 600 during manufacture. The laminate helps to hold items, e.g., optical fiber 604, placed on the substrate 600. The optical fiber 604 is initially disposed as a unit with only two ends 612 and 616. The fibers 604 extend off the board or substrate 600 to allow one sufficient room to terminate the connectors. The fibers or fiber cable 604 extending beyond the substrate 600 may have a little slack to accommodate some off centering.

A first terminal end 616 is the starting point and the fiber 604 curves and goes to a straight section (or ribbon) 620 that has eight fibers in the straight section and then the fiber 604 goes to the first of duplexed pairs or loop backs 624 then makes a loop at 628 again and then goes to the other end to loop again. That pattern repeats such that additional loop backs 632, 636, and 640 are created. Initially applying the fiber 604 in this way allows the fiber 604 to be tested by applying a light at one end, e.g., 616, and then checking for its proper and full delivery to the other end, e.g., 612. One wants to make sure there are no microbends or issues with the fiber before terminating the fiber. After successfully testing, the fiber 604 may be cut and connections completed to connectors as discussed further below (FIG. 22).

The substrate 600 is formed with apertures or holes 644, 648 that align with the integral standoffs 260 of the cassette 100. For example, in one embodiment, the standoff 652 aligns with the hole 648, and the standoff 656 aligns with hole 644. Additional holes and alignment devices may be included as one skilled in the art will appreciate.

After the circuit 602 has been laid down, the path tested to make sure there are no microbends or issues with the fiber 604, the loops 628, 632, 636, 640, 642, 646, 650 are cut at specific locations relative to where the optical plane is. The optical plane is referenced by the adapters, e.g., 192, 120. The center of the adapters is where one typically attaches.

Figure 22:
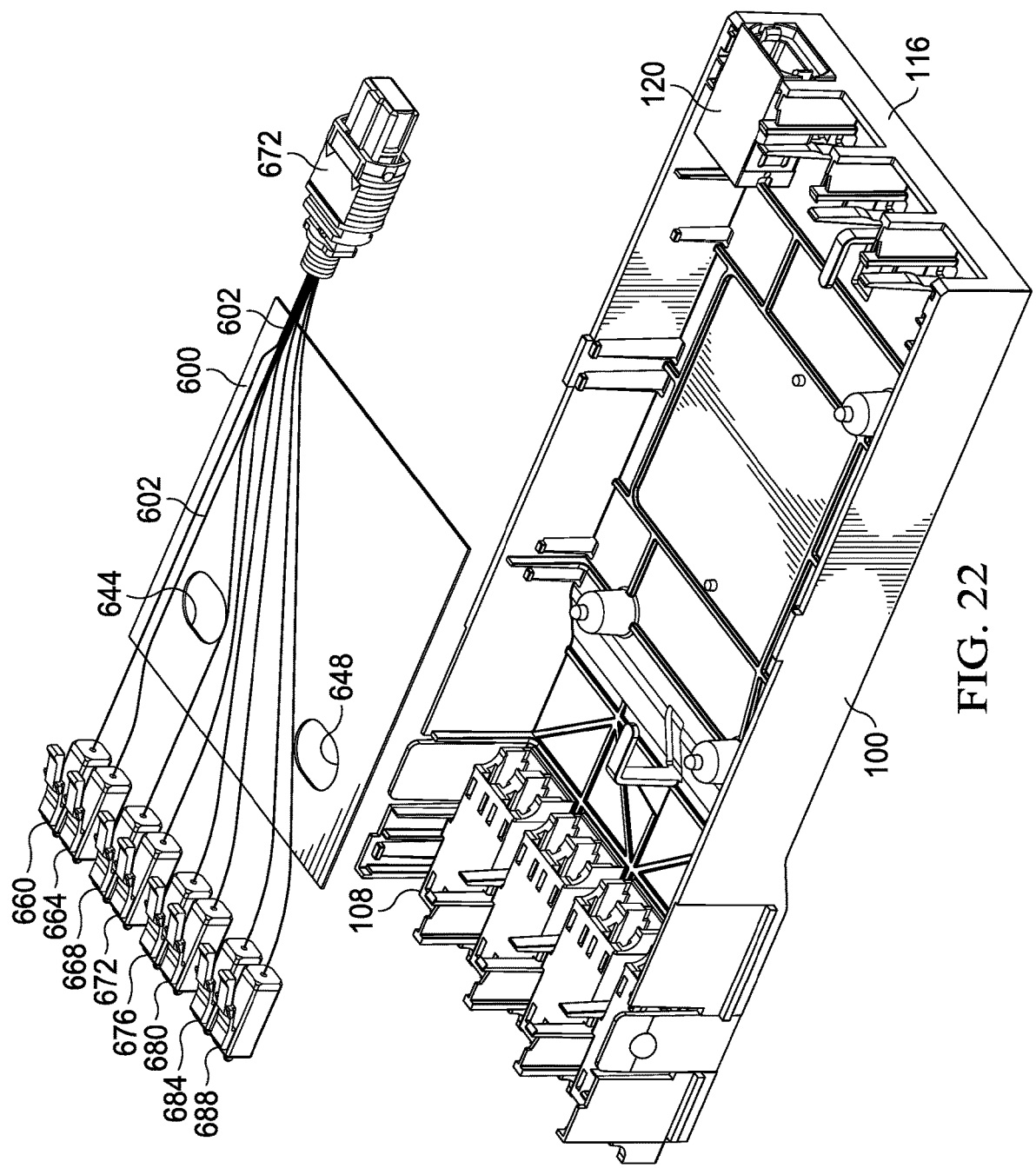
FIG. 22 is a schematic, partially-exploded perspective view of the optical-connector adapter cassette of FIG. 21 with the cover removed and with connectors added to the fiber as an aspect of the optical interconnect circuit.

Thus, in FIG. 22, on one end, the loopbacks 628, 632, 636, 640 (FIG. 21) have been cut and terminated with connectors 660, 664, 668, 672, 676, 680, 684, 688 on the end of those fibers and those connectors 660, 664, 668, 672, 676, 680, 684, 688 connect with the adapters 192 on the front 112. At the other end, loops 642, 646, 650 (FIG. 21) have been cut and terminated with an MPO connector or an array connector 672 that will couple with the adapter 120. Those skilled in the art will understand that numerous adapters and connectors may be used with different numbers of fibers. The termination of the optical circuit may be by connector polishing or splice-on connectors. After the optical circuit has been tested and before termination, one may cleave and strip the fibers as preparation for the termination. This may be done manually with hand tools or possibly by laser.

Figure 23:
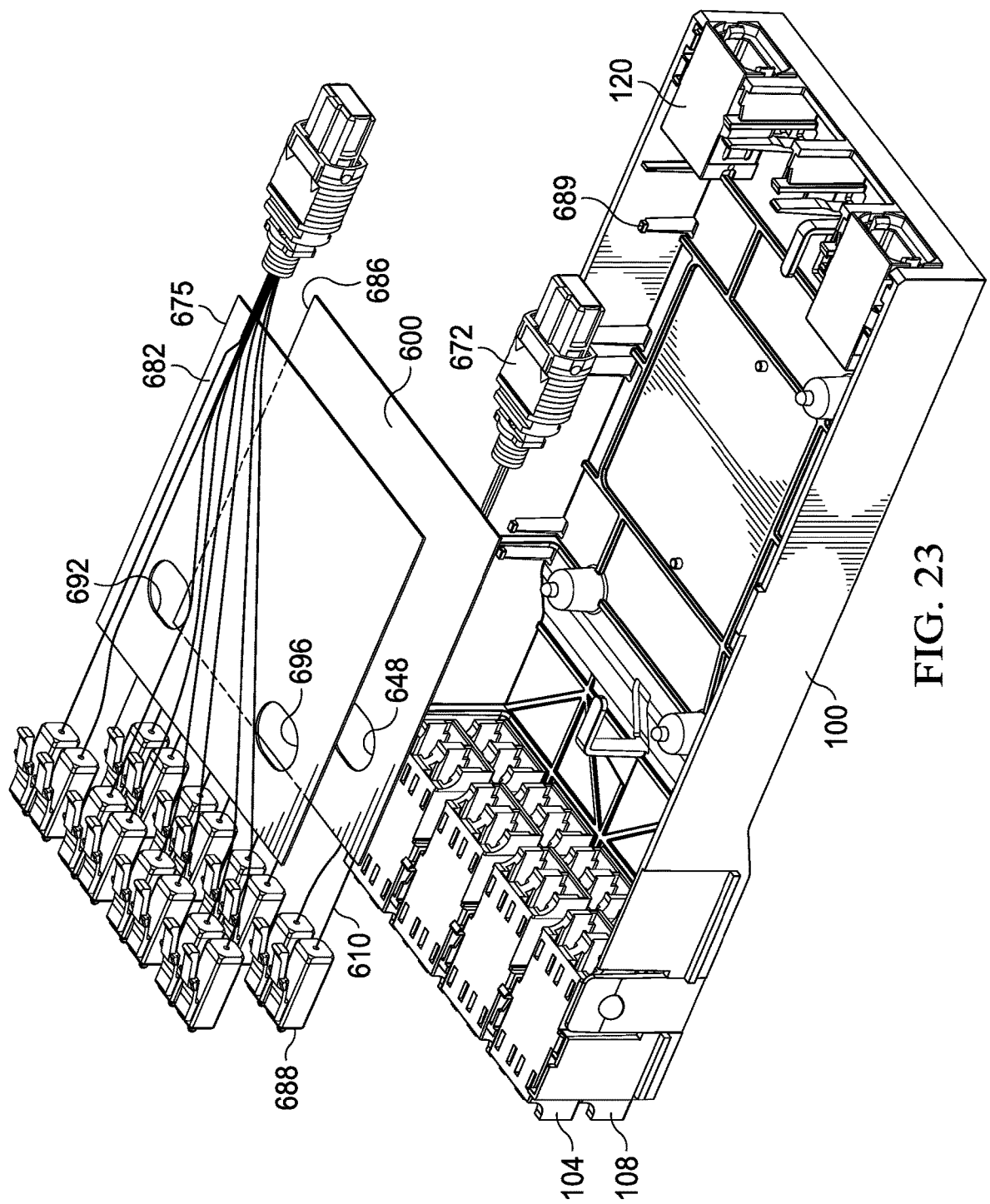
FIG. 23 is a schematic, partially-exploded perspective view of an optical-connector adapter cassette with the cover removed and with two substrates and connectors added to the fiber as an aspect of the optical interconnect circuit.

Referring now primarily to FIG. 23, the cassette 100 may include two substrates 600 and 675 for holding optical circuits. There is a top row 104 and bottom row 108 of adapters in the front 112. One can put multiple optical circuits, e.g., 602 and 610 in the cassette 100 if one wanted to divide them with two or more substrates 600, 675. Alternatively, the substrate 600 could be formed as a larger unit that is the size of substrates 600, 675 combined and then folded at edges 682, 686 to form two layers from a single substrate. That is, the substrate could be one surface that is folded over on itself to be a single unit that is analogous to having the two separate substrates 600, 675 of FIG. 23.

In one illustrative embodiment, a first optical-connector adapter cassette 100 is formed with a folded-over substrate having an optical circuit on one portion (e.g., top side for orientation shown in FIG. 23) and a separate optical circuit on another portion (e.g., top of the bottom fold). In these embodiments, the substrates 600, 675 (or folded-over substrate) may again be formed with alignment holes, e.g., holes 644, 648, 692, 696 that coordinate with standoffs, e.g., standoffs 260.

In the illustrative embodiment of FIG. 23, the substrates 600, 675 rest on each other, or may be sandwiched together. In other embodiments, the substrates 600, 675 may be suspended or supported by lips or ledges formed on the interior side walls of the cassette body at different heights and clearances, e.g., support 689.

For the illustrative embodiment of FIG. 23, the optical circuit associated with substrate 600 may be on a bottom surface for the orientation shown and the optical circuit associated with substrate 675 may be on a top surface for the orientation shown. In another embodiment, the optical circuits may both be on top surfaces of the substrates 600, 675.

Figure 24:
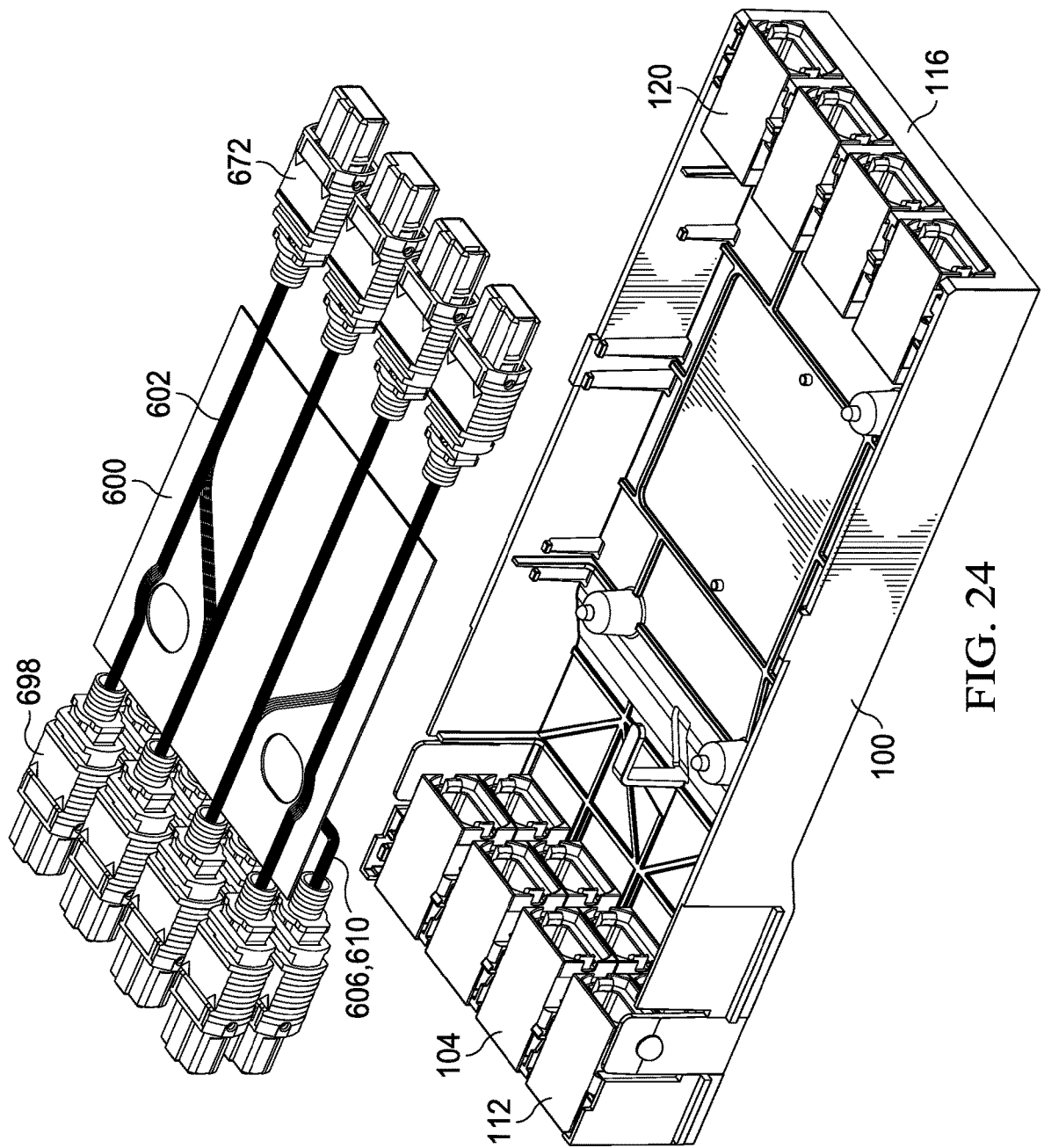
FIG. 24 is a schematic, partially-exploded perspective view of an optical-connector adapter cassette with the cover removed and with one substrate having optical interconnect circuits on each side.

Referring now primarily to FIG. 24, another illustrative embodiment is presented that is analogous to those previously presented, except the substrate 600 has optical circuits formed on each side of the same substrate 600. Thus, optical fibers 604 are shown on the top surface for the orientation shown and optical fibers 606 are shown on the bottom surface for the orientation shown. The front end 112 has two rows of connectors, e.g., connector 698, with four connectors in each row and the rear has four connectors, e.g., connector 672.

A feature of at least some of the illustrative embodiments herein is the higher density that is accomplished with a modular solution.

According to one embodiment, a high density, modular fiber optic termination and patching platform is presented. The platform supports pre-term fiber counts and formats—8f, 12f, 16f, and 24f MPO connectors and with a high port density per 1RU space—96 duplex LC ports. The same platform can accommodate the same number of MPO ports per 1RU. The cassettes also support traditional field termination, splicing, splitting, TAPing, and other Enterprise and Broadband applications.

An aspect of an illustrative embodiment herein provides for a modular fiber optic patching/termination solution, capable of supporting up to 96 ports per 1RU (or 192 fibers utilizing duplex LC ports).

An aspect of some illustrative embodiments herein provides cassettes designed to accommodate (up to) 16 fibers (using duplex LC's), and either 8 fiber or 16 fiber MPO's. An aspect of some illustrative embodiments herein provides cassettes designed to accommodate (up to) 24 fibers (using duplex LC's), and either 8 fiber, 12 fiber, or 24 fiber MPO's. An aspect of some illustrative embodiments herein incorporates standards-compliant connectors and adapters.

An aspect of some illustrative embodiments herein provides adapters that are a "SC-cutout" format. Component modularity allows duplex LC's, simplex SC's, and MPO adapters in any necessary combination in the cutouts.

An aspect of some illustrative embodiments herein provides port density that is achieved by direct-stacking of adapters within the front face of the cassettes.

An aspect of some illustrative embodiments herein provides for a full-port density in front of cassettes, ½ port density in rear.

An aspect of some illustrative embodiments herein provides a cassette density that is achieved by "goose-necking" or "joggling" the cassette body to effectively replace the tray at the front patching side, effectively cantilevering the cassette(s) in front of the sliding tray.

An aspect of some illustrative embodiments herein provides for a cassette that attaches to sliding trays in a shelf/chassis, in 1RU, 2RU, and 4RU configurations.

An aspect of some illustrative embodiments herein provides for an arrangement that includes multiple trays, e.g., (2) sliding trays, 2RU includes (4) sliding trays, 4RU includes (8) sliding trays. Each tray can accommodate up to (4) 12-port cassettes or up to (6) 8-port cassettes. In some embodiments, port density per RU is the same regardless of format. Format can be extended to accomplish any quantity or rack units, maintaining consistent port density per one rack unit.

An aspect of some illustrative embodiments herein provides for cassettes that attach to the trays as-like sliding in an "8-track tape." For example, in FIG. 13, the cassette 100 may be introduced with the lip 536 resting on the top edge 449 of the and the bottom edge 450 supported on slide rails or projections 300, 304 on the cassette 100. In this way, the cassette 100 may be directed toward the back of the tray or shelf 400 until the indent/ball 232 interfaces with the socket 452 on the partitioning wall 448 to hold the cassette 100 in an attached position.

An aspect of some illustrative embodiments herein provides for tray guides that can be reconfigured to accommodate either 8-port or 12-port cassettes on the same tray.

An aspect of some illustrative embodiments herein provides for a cassette that can be deployed as fully pre-termed (MPO-LC, SC, or other single-fiber connectors); fully pre-termed (MPO-MPO); empty for field termination; with pigtails for in-cassette splicing (single-fiber or ribbon); as a Broadband splitter; as an Enterprise TAP, and many other applications.

It should be understood that numerous embodiments and illustrations are possible. Some additional illustrative embodiments or examples include the following.

Example 1

According to one illustrative embodiment an optical-connector shelf assembly comprising: a fiber-optic enclosure having an interior portion and a plurality of trays at least partially within the interior portion and a first optical-connector adapter cassette and a second optical-connector adapter cassette supported by the plurality of trays. Each optical-connector adapter cassette including: a housing having a front wall, a back wall that is opposite the front wall, a first side wall, a second side wall that is opposite the first side wall, a floor wall, and a cover that together form a cassette interior space. The front wall and the back wall may be partial walls or walls formed with large openings or formed mere towers or posts. The cover is substantially rectangular in a top view. The first side wall and second side wall each have a front end and a back end. The front end and the back end are separated by a longitudinal distance D. The front end of the first side wall and the front end of the second side wall each have a height H1. The back end of the first side wall and the back end of the second side wall each have a height H2, and wherein H1>H2. A goose-neck section is formed on the first side wall and the second side wall closer to the front portion than the back portion. Each optical-connector adapter cassette further includes at least one multi-fiber cable adapter mounted with one or more openings on the back wall of the housing; a plurality of fiber-optic adapters mounted within openings on the front wall of the housing; and optical connections positioned within the interior of the housing connected to the at least one multi-fiber cable adapter and the plurality of fiber-optic adapters.

The first optical-connector adapter cassette and the second optical-connector adapter cassette are supported by the plurality of trays with the floor wall of the first optical-connector adapter cassette proximate to the cover of the second optical-connector adapter cassette at a front section proximate the goose-neck section of each and wherein the plurality of trays does not extend between a front section of the first optical-connector adapter cassette and a front section of the second optical-connector adapter cassette. Proximate means near but does not require touching. Proximate in some embodiments just means within 0.125 inches or within 0.2 inches.

Example 2

The optical-connector shelf assembly of Example 1, wherein the height H1 is maintained along the first side wall and the second side wall toward the back end for a distance that is between 10% of D and 50% of D to form the goose-neck section of the housing at a front portion.

Example 3

The optical-connector shelf assembly of Example 1 or Example 2, wherein H1>H2 by at least 30% of H1. It could also be by at least 10% to 50% of H1 or any amount there between, e.g., 40%.

Example 4

The optical-connector shelf assembly of Example 1-3, wherein for each of the first and second optical-connector adapter cassettes, the cover extends laterally beyond the first side wall and second side wall to form a lip (or overhang); wherein each of the first and second side walls has slide rails extending from an outer surface (like projections; see, e.g., 300, 304) there from on the front section; wherein the plurality of trays comprises a plurality of partitioning walls having a first longitudinal edge and a second longitudinal edge; and wherein for each, the lip and the slide rails are sized and configured so at least one of the plurality of partitioning walls fits and slides between the lip and slide rails.

Example 5

The optical-connector shelf assembly of any of Examples 1-4, wherein each of the plurality of trays has a top surface and further comprising a plurality of partitioning walls mounted to the top surface and extending beyond a lateral edge of the plurality of trays to form a cantilevered portion of each partitioning wall.

Example 6

The optical-connector shelf assembly of any of Examples 1-5, wherein the floor wall of the first optical-connector adapter cassette is within at least 0.125 inches of the cover of the second optical-connector adapter cassette.

Example 7

The optical-connector shelf assembly of any of Examples 1-6, wherein D is approximately 6 inches and the goose-neck extends from the front end approximately 1.5 inches.

Example 8

The optical-connector shelf assembly of any of Examples 1-7, wherein H1 is about 0.83 inches and H2 is about 0.67 inches.

Example 9

The optical-connector shelf assembly of any of Examples 1-7, wherein H1 is about 0.83 inches and H2 is about 0.67 inches, wherein the width of the front wall is about 2.7 inches and the width of the back wall is approximately 2.6 inches.

Example 10

The optical-connector shelf assembly of any of Examples 1-7, wherein H1 is about 0.83 inches and H2 is about 0.67 inches, wherein the width of the front wall is about 3.9 inches and the width of the back wall is approximately 3.8 inches.

Example 11

The optical-connector shelf assembly of any of Examples 1-10, wherein the first side wall and second side wall are primarily straight except for a transition forming the goose-neck portion comprises an angled section having an angle between 20 degrees and 80 degrees, which includes any angle there between.

Example 12

The optical-connector shelf assembly of any of Examples 1-11, wherein a transition from the goose-neck portion comprises an angled section, and wherein the angled section extends longitudinally less than approximately 10% of D and greater than 2% of D.

Example 13

The optical-connector shelf assembly of any of Examples 1-12, where the first optical-connector adapter cassette and the second optical-connector adapter cassette each comprises a first substrate having an optical circuit thereon.

Example 14

The optical-connector shelf assembly of any of Examples 1-12, where the first optical-connector adapter cassette and the second optical-connector adapter cassette each comprises a first substrate having a first optical circuit thereon and a second substrate having a second optical circuit thereon.

Example 15

The optical-connector shelf assembly of any of Examples 1-11, where the first optical-connector adapter cassette and the second optical-connector adapter cassette each are formed with a folded-over substrate having an optical circuit on one portion and a separate optical circuit on another portion.

Example 16

According to still another illustrative example, an optical-connector adapter cassette comprising: a housing having a front wall, a back wall that is opposite the front wall, a first side wall, a second side wall that is opposite the first side wall, a floor wall, and a cover that together form a cassette interior space. The cover is rectangular in a top view. The first side wall and second side wall each have a front end and a back end separated by a longitudinal distance D. The front end of the first side wall and the front end of the second side wall both have a height H1. The back end of the first side wall and the back end of the second side wall each have a height H2, and wherein H1>H2. The optical-connector adapter cassette also includes a first goose-neck section is formed on the first side wall and the second side wall closer to the front wall than the back wall; at least one opening sized and configured to receive at least one multi-fiber cable adapter on the back wall of the housing; and a plurality openings formed on the front wall that are sized and configured to receive a plurality of fiber-optic adapters at the front wall of the housing.

Example 17

The optical-connector adapter cassette of Example 16, wherein the height H1 extends along the first side wall and the second side wall from the front end towards the back end for a distance that is between 10% of D and 50% of D to form the first goose-neck section.

Example 18

The optical-connector adapter cassette of Example 16 or Example 17, wherein 0.5H1>H2.

Example 19

The optical-connector adapter cassette of any of Examples 16-18, further comprising: at least one multi-fiber cable adapter disposed with the at least one opening sized and configured to receive at least one multi-fiber cable adapter on the back wall of the housing; a plurality of fiber-optic adapters disposed within the plurality opening on the front wall sized and configured to receive a plurality of fiber-optic adapters on the front wall of the housing; and optical connections positioned within the interior of the housing connected to the multi-fiber cable adapter and the plurality of fiber-optic adapters.

Example 20

The optical-connector adapter cassette of any of Examples 16-19, wherein D is approximately 6 inches and the first goose-neck extends from the front end approximately 1.5 inches.

Example 21

The optical-connector adapter cassette of any of Examples 16-20, wherein H1 is about 0.83 inches and H2 is about 0.67 inches.

Example 22

The optical-connector adapter cassette of any of Examples 16-21, wherein the optical-connector adapter cassette comprises an 8-port cassette, and wherein H1 is about 0.83 inches and H2 is about 0.67 inches, wherein the width of the front wall is about 2.7 inches and the width of the back wall is approximately 2.6 inches.

Example 23

The optical-connector adapter cassette of any of Examples 16-21, wherein the optical-connector adapter cassette comprises a 12-port cassette, wherein H1 is about 0.83 inches and H2 is about 0.67 inches, and wherein the width of the front wall is about 3.9 inches and the width of the back wall is approximately 3.8 inches.

Example 24

The optical-connector adapter cassette of any of Examples 16-23, wherein the first side wall and second side wall are primarily straight except for a transition forming the goose-neck portion comprises an angled section having an angle between 20 degrees and 80 degrees.

Example 25

The optical-connector adapter cassette of any of Examples 16-24, wherein a transition from the first gooseneck portion comprises an angled section, and wherein the angled section extends less than approximately 10% of D and greater than 2% of D.

Example 26

The optical-connector adapter cassette of any of Examples 16-25, further comprising a first substrate disposed within an interior of the optical-connector adapter cassette and having a first optical circuit formed at least partially on the first substrate, and wherein the first optical circuit optically couples front connectors with rear connectors.

Example 27

The optical-connector adapter cassette of any of Examples 16-25, further comprising: a first substrate disposed within an interior of the optical-connector adapter cassette having a first optical circuit formed at least partially on the substrate, and a second substrate disposed within the interior of the optical-connector adapter cassette having a second optical circuit formed at least partially on the second substrate.

Example 28

The optical-connector adapter cassette of any of Examples 16-24, wherein a transition from the first goose-neck portion comprises a first angled section, and further comprising a second goose-neck section formed between 10% of D and 50% of D on an opposite side of the cassette from the first goose-neck section.

Example 29

The optical-connector adapter cassette of any of Examples 16-28, wherein the cover extends laterally beyond the first side wall and second side wall to form a lip on each side, and wherein the lip extends between 1 mm and 2 mm beyond the first side wall and second side wall.

Although the present invention and its advantages have been disclosed in the context of certain illustrative, non-limiting embodiments, it should be understood that various changes, substitutions, permutations, and alterations can be made without departing from the scope of the invention as defined by the claims. It will be appreciated that any feature that is described in connection with any one embodiment may also be applicable to any other.

What is claimed:
1. An optical-connector shelf assembly comprising:
a fiber-optic enclosure having an interior portion and a plurality of trays at least partially within the interior portion;
a first optical-connector adapter cassette and a second optical-connector adapter cassette supported by the plurality of trays, each optical-connector adapter cassette comprising:
a housing having a front wall, a back wall that is opposite the front wall, a first side wall, a second side wall that is opposite the first side wall, a floor wall, and a cover that together form a cassette interior space,
wherein the cover is substantially rectangular in a top view,
wherein the first side wall and second side wall each have a front end and a back end, the front end and the back end being separated by a longitudinal distance D,
wherein the front end of the first side wall and the front end of the second side wall each have a height H1,
wherein the back end of the first side wall and the back end of the second side wall each have a height H2, and wherein H1>H2, and a goose-neck section is formed on the first side wall and the second side wall closer to the front portion than the back portion,
at least one multi-fiber cable adapter mounted with one or more openings on the back wall of the housing,
a plurality of fiber-optic adapters mounted within openings on the front wall of the housing, and
optical connections positioned within the interior of the housing connected to the at least one multi-fiber cable adapter and the plurality of fiber-optic adapters;
wherein the first optical-connector adapter cassette and the second optical-connector adapter cassette are supported by the plurality of trays with the floor wall of the first optical-connector adapter cassette proximate to the cover of the second optical-connector adapter cassette at a front section proximate the goose-neck section of each and wherein the plurality of trays does not extend between a front section of the first optical-connector adapter cassette and a front section of the second optical-connector adapter cassette;
wherein for each of the first and second optical-connector adapter cassettes, the cover extends laterally beyond the first side wall and second side wall to form a lip;
wherein each of the first and second side walls has slide rails extending from an outer surface therefrom on the front section;
wherein the plurality of trays comprises a plurality of partitioning walls having a first longitudinal edge and a second longitudinal edge; and
wherein the lip and the slide rails are sized and configured such that at least one of the plurality of partitioning walls fits and slides between the lip and slide rails.

2. The optical-connector shelf assembly of claim 1, wherein the height H1 is maintained along the first side wall and the second side wall toward the back end for a distance that is between 10% of D and 50% of D to form the goose-neck section of the housing at a front portion.

3. The optical-connector shelf assembly of claim 1, wherein H1>H2 by at least 30% of H1.

4. The optical-connector shelf assembly of claim 1, wherein each of the plurality of trays comprises: a top surface; the plurality of partitioning walls mounted to the top surface of the tray and extending beyond a lateral edge of the plurality of trays to form a cantilevered portion of each partitioning wall.

5. The optical-connector shelf assembly of claim 1, wherein the floor wall of the first optical-connector adapter cassette is within at least 0.125 inches of the cover of the second optical-connector adapter cassette.

6. The optical-connector shelf assembly of claim 1, wherein D is approximately 6 inches and the goose-neck extends from the front end approximately 1.5 inches.

7. The optical-connector shelf assembly of claim 1, wherein H1 is about 0.83 inches and H2 is about 0.67 inches.

8. The optical-connector shelf assembly of claim 1, wherein H1 is about 0.83 inches and H2 is about 0.67 inches, wherein the width of the front wall is about 2.7 inches and the width of the back wall is approximately 2.6 inches.

9. The optical-connector shelf assembly of claim 1, wherein H1 is about 0.83 inches and H2 is about 0.67 inches, wherein the width of the front wall is about 3.9 inches and the width of the back wall is approximately 3.8 inches.

10. The optical-connector shelf assembly of claim 1, wherein the first side wall and second side wall are primarily straight except for a transition forming the goose-neck portion comprises an angled section having an angle between 20 degrees and 80 degrees.

11. The optical-connector shelf assembly of claim 1, wherein a transition from the goose-neck portion comprises an angled section, and wherein the angled section extends longitudinally less than approximately 10% of D and greater than 2% of D.

12. The optical-connector shelf assembly of claim 1, where the first optical-connector adapter cassette and the second optical-connector adapter cassette each comprises a first substrate having an optical circuit thereon.

13. The optical-connector shelf assembly of claim 1, where the first optical-connector adapter cassette and the second optical-connector adapter cassette each comprises a first substrate having a first optical circuit thereon and a second substrate having a second optical circuit thereon.

14. The optical-connector shelf assembly of claim 1, where the first optical-connector adapter cassette and the second optical-connector adapter cassette each are formed with a folded-over substrate having an optical circuit on one portion and a separate optical circuit on another portion.

15. An optical-connector adapter cassette comprising:
   a housing having a front wall, a back wall that is opposite the front wall, a first side wall, a second side wall that is opposite the first side wall, a floor wall, and a cover that together form a cassette interior space;
   wherein the cover is rectangular in a top view;
   wherein the first side wall and second side wall each have a front end and a back end separated by a longitudinal distance D, and wherein the front end of the first side wall and the front end of the second side wall both have a height H1 and wherein the back end of the first side wall and the back end of the second side wall each have a height H2, and wherein H1>H2, and wherein a first goose-neck section is formed on the first side wall and the second side wall closer to the front wall than the back wall;
   at least one opening sized and configured to receive at least one multi-fiber cable adapter on the back wall of the housing;
   a plurality of openings formed on the front wall that are sized and configured to receive a plurality of fiber-optic adapters at the front wall of the housing; and
   wherein the cover extends laterally beyond the first side wall and second side wall to form a lip on each side, and wherein the lip extends between 1 mm and 2 mm beyond the first side wall and second side wall.

16. The optical-connector adapter cassette of claim 15, wherein the height H1 extends along the first side wall and the second side wall from the front end towards the back end for a distance that is between 10% of D and 50% of D to form the first goose-neck section.

17. The optical-connector adapter cassette of claim 15, wherein 0.5H1>H2.

18. The optical-connector adapter cassette of claim 15, further comprising:
   at least one multi-fiber cable adapter disposed with the at least one opening sized and configured to receive at least one multi-fiber cable adapter on the back wall of the housing;
   a plurality of fiber-optic adapters disposed within the plurality opening on the front wall sized and configured to receive a plurality of fiber-optic adapters on the front wall of the housing; and
   optical connections positioned within the interior of the housing connected to the multi-fiber cable adapter and the plurality of fiber-optic adapters.

19. The optical-connector adapter cassette of claim 15, wherein D is approximately 6 inches and the first goose-neck extends from the front end approximately 1.5 inches.

20. The optical-connector adapter cassette of claim 15, wherein H1 is about 0.83 inches and H2 is about 0.67 inches.

21. The optical-connector adapter cassette of claim 15, wherein the optical-connector adapter cassette comprises a 8-port cassette, and wherein H1 is about 0.83 inches and H2 is about 0.67 inches, wherein the width of the front wall is about 2.7 inches and the width of the back wall is approximately 2.6 inches.

22. The optical-connector adapter cassette of claim 15, wherein the optical-connector adapter cassette comprises a 12-port cassette, wherein H1 is about 0.83 inches and H2 is about 0.67 inches, and wherein the width of the front wall is about 3.9 inches and the width of the back wall is approximately 3.8 inches.

23. The optical-connector adapter cassette of claim 15, wherein the first side wall and second side wall are primarily straight except for a transition forming the goose-neck portion comprises an angled section having an angle between 20 degrees and 80 degrees.

24. The optical-connector adapter cassette of claim 15, wherein a transition from the first goose-neck portion comprises an angled section, and wherein the angled section extends less than approximately 10% of D and greater than 2% of D.

25. The optical-connector adapter cassette of claim 15, further comprising a first substrate disposed within an interior of the optical-connector adapter cassette and having a first optical circuit formed at least partially on the first substrate, and wherein the first optical circuit optically couples front connectors with rear connectors.

26. The optical-connector adapter cassette of claim 15, further comprising:
   a first substrate disposed within an interior of the optical-connector adapter cassette having a first optical circuit formed at least partially on the substrate, and
   a second substrate disposed within the interior of the optical-connector adapter cassette having a second optical circuit formed at least partially on the second substrate.

27. The optical-connector adapter cassette of claim 15, wherein a transition from the first goose-neck portion comprises a first angled section, and further comprising a second goose-neck section formed between 10% of D and 50% of D on an opposite side of the cassette from the first goose-neck section.

* * * * *